(12) United States Patent
Shiga et al.

(10) Patent No.: US 11,747,944 B2
(45) Date of Patent: Sep. 5, 2023

(54) TOUCH SENSING DEVICE

(71) Applicant: HOSIDEN CORPORATION, Yao (JP)

(72) Inventors: Naoki Shiga, Yao (JP); Takeshi Isoda, Yao (JP)

(73) Assignee: HOSIDEN CORPORATION, Yao (JP)

( * ) Notice: Subject to any disclaimer, the term of this patent is extended or adjusted under 35 U.S.C. 154(b) by 94 days.

(21) Appl. No.: 17/467,802

(22) Filed: Sep. 7, 2021

(65) Prior Publication Data

US 2022/0083171 A1    Mar. 17, 2022

(30) Foreign Application Priority Data

Sep. 14, 2020 (JP) ................. 2020-153687

(51) Int. Cl.
| | |
|---|---|
| G06F 3/044 | (2006.01) |
| B32B 1/00 | (2006.01) |
| B32B 5/18 | (2006.01) |
| B32B 27/06 | (2006.01) |
| G06F 3/041 | (2006.01) |

(52) U.S. Cl.
CPC .............. *G06F 3/0443* (2019.05); *B32B 1/00* (2013.01); *B32B 5/18* (2013.01); *B32B 27/065* (2013.01); *G06F 3/0445* (2019.05); *B32B 2266/06* (2013.01); *B32B 2266/08* (2013.01); *B32B 2307/51* (2013.01); *B32B 2307/7265* (2013.01); *B32B 2457/208* (2013.01); *G06F 3/0416* (2013.01); *G06F 2203/04107* (2013.01)

(58) Field of Classification Search
CPC .... G06F 3/0443; G06F 3/0445; G06F 3/0416; G06F 2203/04107; G06F 3/0446; G06F 3/041; G06F 3/0447; G06F 3/0412; G06F 2203/04108; B32B 1/00; B32B 5/18; B32B 27/065; B32B 2266/06; B32B 2266/08; B32B 2307/51; B32B 2307/7265; B32B 2457/208; B60K 2370/1446; B60K 37/06
See application file for complete search history.

(56) References Cited

U.S. PATENT DOCUMENTS

| | | | |
|---|---|---|---|
| 10,276,326 B1 * | 4/2019 | Wang | ........... H01H 13/83 |
| 2005/0200286 A1 | 9/2005 | Stoschek et al. | |
| 2012/0162863 A1 | 6/2012 | Caldwell | |
| 2017/0256754 A1 * | 9/2017 | DeFranco | ........... H01L 27/3218 |
| 2018/0061634 A1 | 3/2018 | Lee et al. | |
| 2019/0272058 A1 * | 9/2019 | Noma | ........... G06F 3/0412 |

FOREIGN PATENT DOCUMENTS

JP      2014-086344 A      2/2019

OTHER PUBLICATIONS

Extended European Search Report for European Patent Application No. 21195722.0, issued from the EPO, dated Jan. 28, 2022 (8 pages).

* cited by examiner

*Primary Examiner* — Brian Handville
(74) *Attorney, Agent, or Firm* — Kilyk & Bowersox, P.L.L.C.

(57) ABSTRACT

A touch sensing device including a sensor and a water shielding layer. The sensor is a capacitive, resistive, or optical touch sensor and is configured to detect a detection target approaching the sensor from one side in a first direction. The first direction is a thickness direction of the sensor. The water shielding layer is composed of waterproof elastic substance, is disposed on the one side in the first direction relative to the sensor, and covers at least part of the sensor.

19 Claims, 12 Drawing Sheets

TOUCH SENSING DEVICE

CROSS-REFERENCE TO RELATED APPLICATIONS

The present application claims priority under 35 U.S.C. § 119 of Japanese Patent Application No. 2020-153687 filed on Sep. 14, 2020, the disclosure of which is expressly incorporated by reference herein in its entirety.

BACKGROUND OF THE INVENTION

Technical Field

The invention relates to touch sensing devices.

Background Art

Japanese Unexamined Patent Application Publication No. 2014-086344 discloses a conventional touch sensing device. The touch sensing device includes a sensor, a protective e film, and first and second insulating films. The sensor includes a sensor circuit board and a sensor electrode. The sensor circuit board has first and second faces opposite to each other. The protective film is provided on the first face of the sensor circuit board and has a touch region. The sensor electrode is a sensor electrode for capacitive sensing provided on the second face of the sensor circuit board. A change in capacitance caused by a touch on the touch region by a human finger is outputted as a signal from the sensor electrode. The first insulating film is provided on the second face of the sensor circuit board covering the sensor electrode. The second insulating film is provided on the first insulating film and has graphics for display.

Disposed below the second insulating film is a backlight for illuminating the graphics in the second insulating film. The first insulating film has such a transmittance that a viewer can visually recognize the graphics of the second insulating film displayed on the touch region when the backlight is illuminating, but cannot visually recognize the graphics of the second insulating film displayed on the touch region when the backlight is turned off.

SUMMARY OF INVENTION

The protective film may become scratched or ripped, due to aging or other causes, raising the possibility of entry of water through the scratch or the rip. Also, the sensor circuit board is a dielectric constituted by soda-lime glass or the like and located immediately below the protective film. In other words, the sensor circuit board is a rigid board located immediately below the protective film, providing a stiff feeling to a touch on the touch region of the protective film.

The invention provides a touch sensing device having an improved waterproofness and providing an improved feeling to a user when operating the touch sensing device.

A touch sensing device according to an aspect of the invention may include a sensor and a water shielding layer. The sensor is a capacitive, resistive, or optical touch sensor and is configured to detect a detection target approaching the sensor from one side in a first direction. The first direction is a thickness direction of the sensor. The water shielding layer is composed of waterproof elastic substance, is disposed on the one side in the first direction relative to the sensor, and covers at least part of the sensor.

In the touch sensing device of this aspect, liquid, such as water or sweat, from the one side in the first direction is blocked by the water shielding layer, and hardly reaches the sensor located on the other side in the first direction relative to the water shielding layer. Therefore the touch sensing device has improved waterproofness. Further, the water shielding layer is configured to be elastically deformed when pressed by a detection target from the one side in the first direction. This configuration provides an improved feeling to a user when operating the touch sensing device.

The water shielding layer may be smaller in projected area in a plan view from the one side in the first direction (hereinafter referred to simply as "projected area in the plan view") than the sensor.

Alternatively, the water shielding layer may be substantially as large as, or larger than, the sensor in projected area in the plan view. In this case, the water shielding layer may be disposed on the one side in the first direction relative to the sensor and may cover substantially the entire sensor.

The water shielding layer may include a first main face on the one side in the first direction, a second main face on the other side in the first direction, and a side face intersecting the second main face. The second main face of the water shielding layer may be in surface contact with the first main face of the sensor or alternatively in contact with the first main face of the sensor via an interlayer member disposed therebetween.

The touch sensing device according to any of the above aspects may further include an exhaust layer. The exhaust layer may be disposed between the water shielding layer and the sensor, and may include a first main face on the one side in the first direction, a second main face on the other side in the first direction, and a side face intersecting the second main face. In this case, the second main face of the exhaust layer may be in surface contact with the first main face of the sensor or alternatively in contact via an interlayer member disposed therebetween.

The touch sensing device according to any of the above aspects may further include at least one exhaust path. The at least one exhaust path may be provided on at least one face of the second main face of the water shielding layer or the first main face of the sensor, may open out to the at least one face, and may open out to a side face intersecting the at least one face. Alternatively, the at least one exhaust path may be provided in the interlayer member, may open out to the at least one face of the second main face of the water shielding layer and the first main face of the sensor, and may open out to a side face of the interlayer member.

Alternatively, the at least one exhaust path may be provided on at least one face of the second main face of the exhaust layer or the first main face of the sensor, may open out to the at least one face, and may open out to a side face intersecting the at least one face. Alternatively, the at least one exhaust path may be provided in the interlayer member, may open out to the at least one face of the second main face of the exhaust layer and the first main face of the sensor, and may open out to a side face of the interlayer member.

The exhaust layer may be composed of an open-cell foam substance inside of which a plurality of interconnected bubbles is provided. The plurality of bubbles in the exhaust layer includes a first bubble opening out to the second main face of the exhaust layer, a second bubble opening out to the side face of the exhaust layer, and at least one third bubble connecting the first bubble and the second bubble. The first bubble, the second bubble, and the at least one third bubble may constitute the at least one exhaust path.

The sensor may include at least one sensor layer and at least one first electrode. In this case, the at least one sensor layer may include a first sensor layer. The first sensor layer may include a first main face on the one side in the first direction and a second main face on the other side in the first direction. The at least one first electrode may be provided on at least one face of the first or second main face of the first sensor layer. The at least one first electrode may be configured such that signals of the or each first electrode change in accordance with a change in capacitance between a detection target and the or each first electrode, the change being caused by an approach of the detection target from the one side in the first direction.

The sensor may further include at least one second electrode on at least one face of the first or second main face of the first sensor layer.

The at least one sensor layer of the sensor may further include a second sensor layer on the other side in the first direction relative to the first sensor layer. The second sensor layer may include a first main face on the one side in the first direction and a second main face on the other side in the first direction. The at least one second electrode may not be provided on at least one face of the first or second main face of the first sensor layer, but on at least one face of the first or second main face of the second sensor layer.

The at least one first electrode may be configured to such that signals of the or each first electrode change in accordance with a change in capacitance between the or each first electrode and the or each second electrode, the change being caused by an approach of the detection target from the one side in the first direction.

The at least one first electrode may be configured such that signals of the or each first electrode change in accordance with a first change in capacitance between the or each first electrode and a detection target, and such that signals of the or each first electrode change in accordance with a second change in capacitance between the or each first electrode and the or each second electrode, the first and second changes being caused by an approach of the detection target from the one side in the first direction.

The touch sensing device according to any of the above aspects may further include an outer layer or cover and at least one first intermediate layer. The outer layer or cover may include a touch region to be contacted by a detection target from the one side in the first direction. In this case, the at least one first intermediate layer may include the water shielding layer. The at least one first intermediate layer may further include the exhaust layer.

Where the outer layer is provided, the at least one first intermediate layer may be interposed between the outer layer and the sensor, and the water shielding layer may be disposed on the other side in the first direction relative to at least part of the outer layer.

Where the cover is provided, the at least one first intermediate layer may be may be interposed between the cover and the sensor.

The outer layer or the cover may be provided with a through hole. In this case, the water shielding layer may block the through hole of the outer layer or cover from the other side in the first direction.

The outer layer or cover may include a plurality of parts, and adjacent two of the parts may be joined together. The water shielding layer may be in surface contact with a joint of the two adjacent parts from the other side in the first direction.

The touch sensing device according to any of the above aspects may further include a housing.

The housing may be configured to support the sensor. The water shielding layer may be larger than, the sensor in projected area in the plan view. The water shielding layer may be disposed between the outer layer and a combination of the sensor and the housing.

Where the cover is provided, the touch sensing device may further include an outer layer. The outer layer may have an opening in place of a touch region. The cover may be exposed through, or accommodated in, the opening of the outer layer.

Where the cover is provided, the touch sensing device may further include a second intermediate layer between the outer layer and the housing. The second intermediate layer may include an accommodation hole. The accommodation hole of the second intermediate layer may accommodate the at least one first intermediate layer.

The at least one first intermediate layer may further include a print layer. The print layer may include at least one translucent portion and an opaque portion other than the at least one translucent portion. The water shielding layer may be translucent.

Where the second intermediate layer is omitted, the housing may have an accommodating portion, and the cover may be exposed through, or accommodated in, the accommodating portion.

Figure 1:
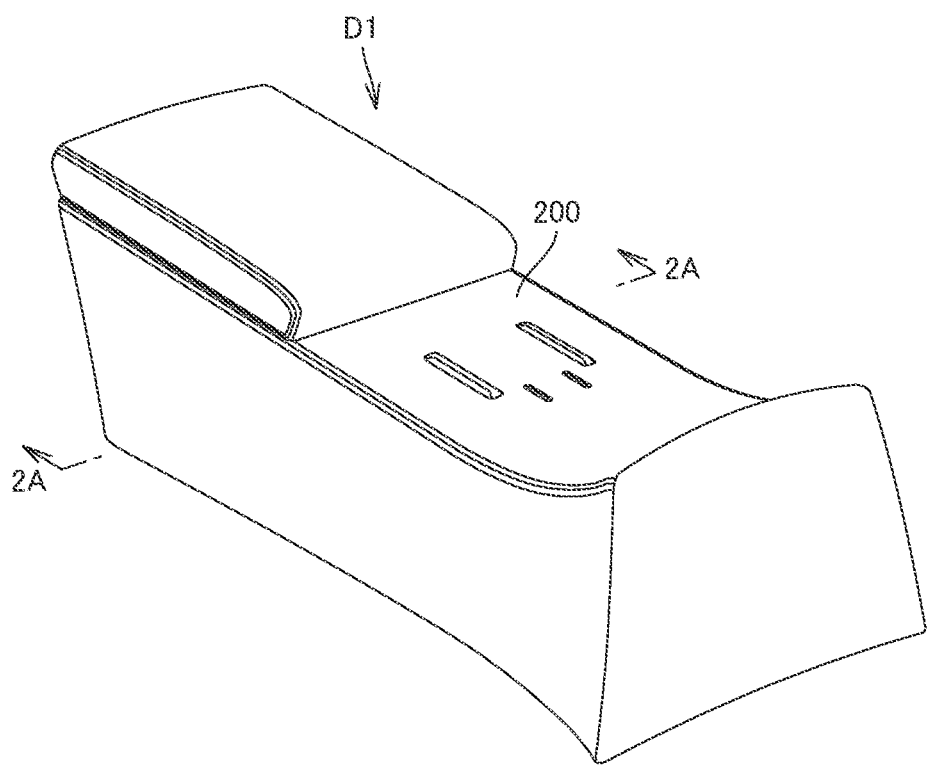
FIG. 1 is a front, top, left perspective view of a touch sensing device according to a first embodiment of the invention.

In the brief description of the drawings above and the description of embodiments which follows, relative spatial terms such as "upper", "lower", "top", "bottom", "left", "right", "front", "rear", etc., are used for the convenience of the skilled reader and refer to the orientation of the touch sensing devices and their constituent parts as depicted in the drawings. No limitation is intended by use of these terms, either in use of the invention, during its manufacture, shipment, custody, or sale, or during assembly of its constituent parts or when incorporated into or combined with other apparatus.

DESCRIPTION OF EMBODIMENTS

Hereinafter described are first, second, and third embodiments of the invention and their variants. It should be noted that constituents of the embodiments and their variants to be described can be combined in any possible manner. It should also be noted that the materials, the shapes, the dimensions, the numbers, the arrangements, etc. that constitute each constituent of the embodiments and their variants to be described are presented by way of example only and can be modified in any manner as long as the same functions can be fulfilled.

First Embodiment

Figure 2A:
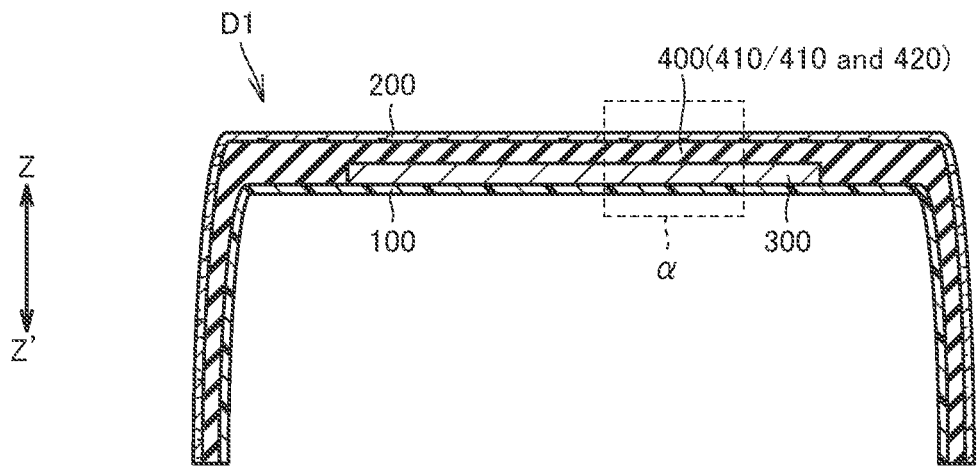
FIG. 2A is a schematic end view, taken along 2A-2A in FIG. 1, of the connector of the first embodiment.
Figure 2B:
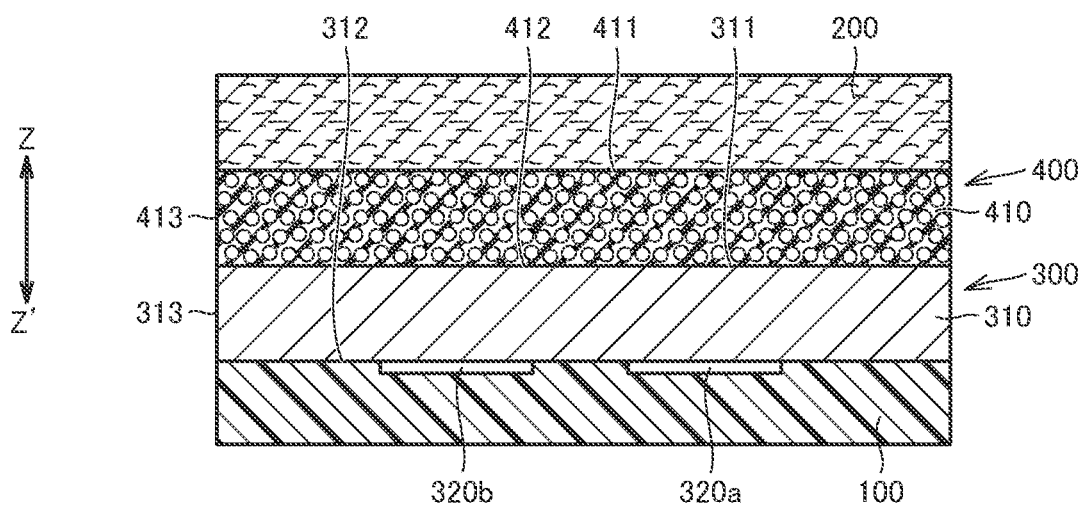
FIG. 2B is a schematic partially enlarged view of a portion α in FIG. 2A of the connector of the first embodiment.
Figure 3A:
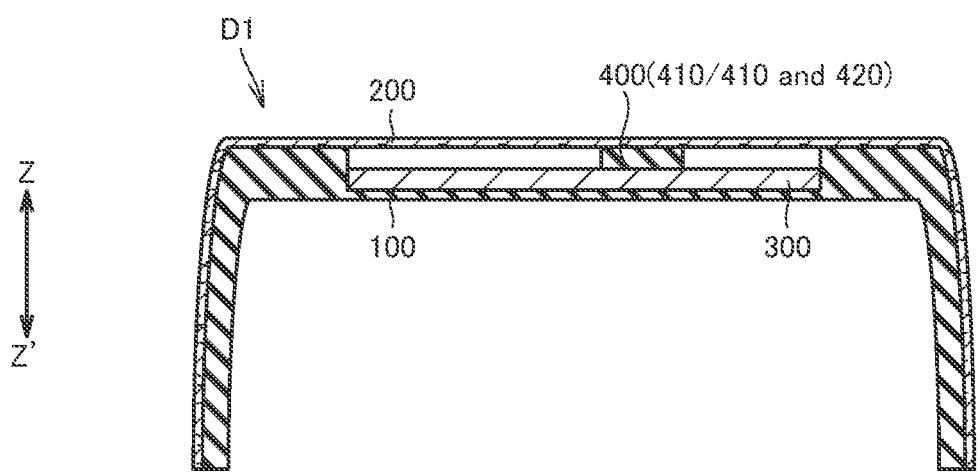
FIG. 3A is a schematic end view, corresponding to FIG. 2A, of a first variant of the connector of the first embodiment.
Figure 3B:
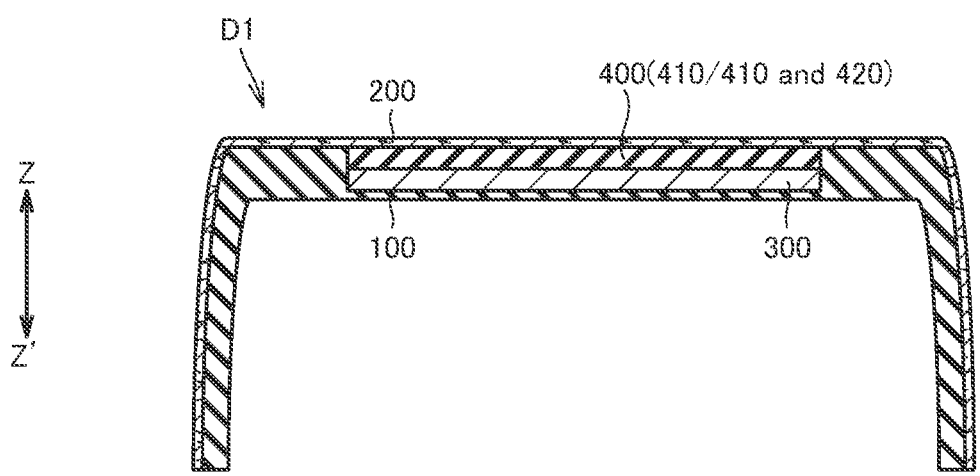
FIG. 3B is a schematic end view, corresponding to FIG. 2A, of a second variant of the connector of the first embodiment.
Figure 3C:
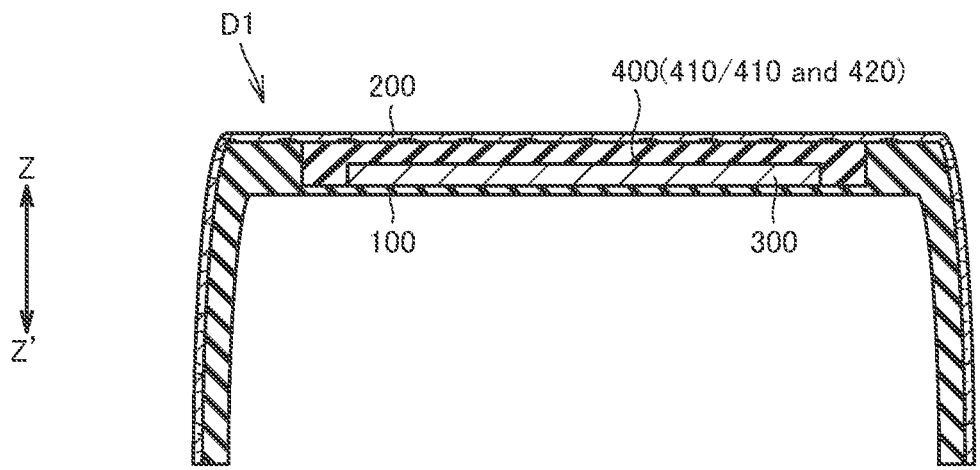
FIG. 3C is a schematic end view, corresponding to FIG. 2A, of a third variant of the connector of the first embodiment.
Figure 4A:
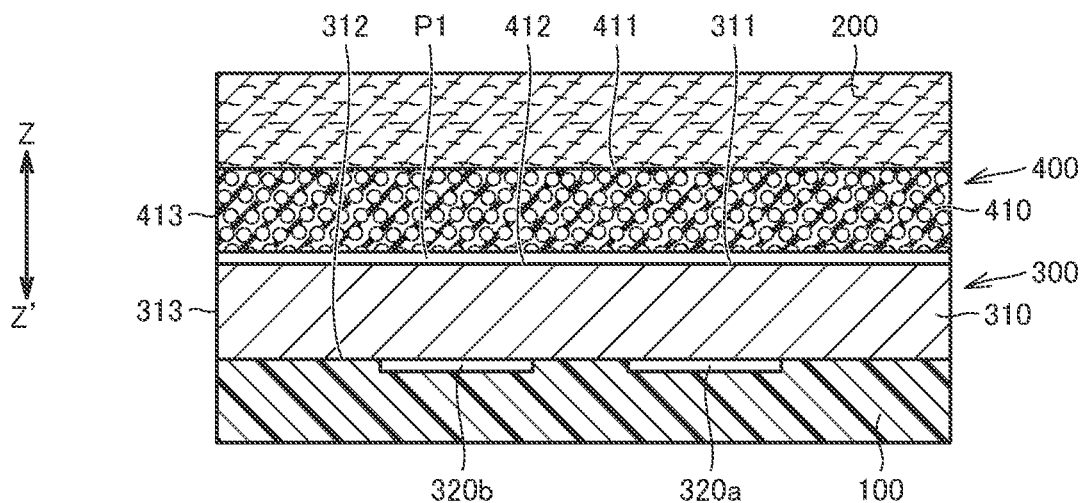
FIG. 4A is a schematic partially enlarged view, corresponding to FIG. 2B, of a fourth variant of the connector of the first embodiment.
Figure 4B:
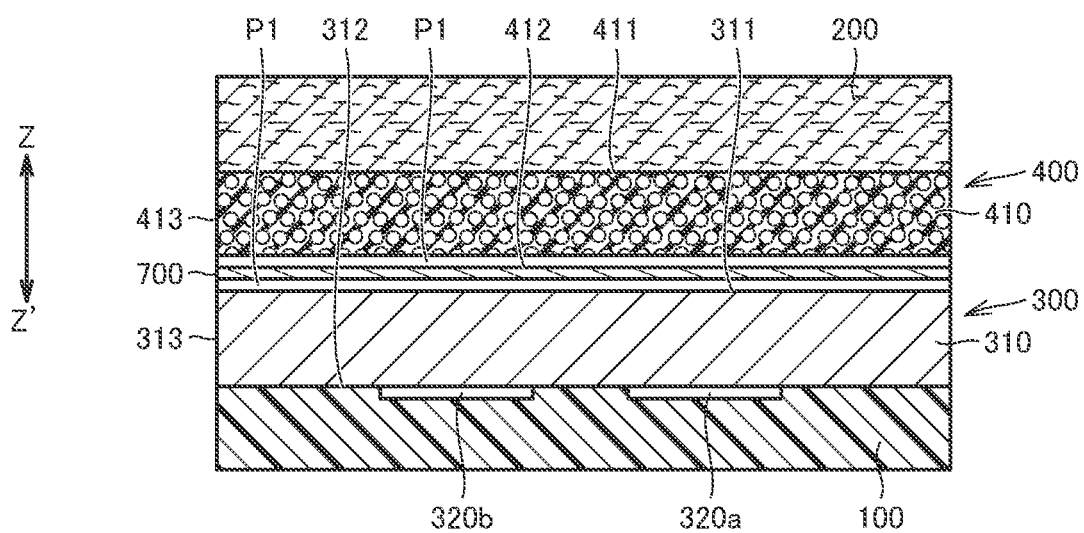
FIG. 4B is a schematic partially enlarged view, corresponding to FIG. 2B, of a fifth variant of the connector of the first embodiment.
Figure 5A:
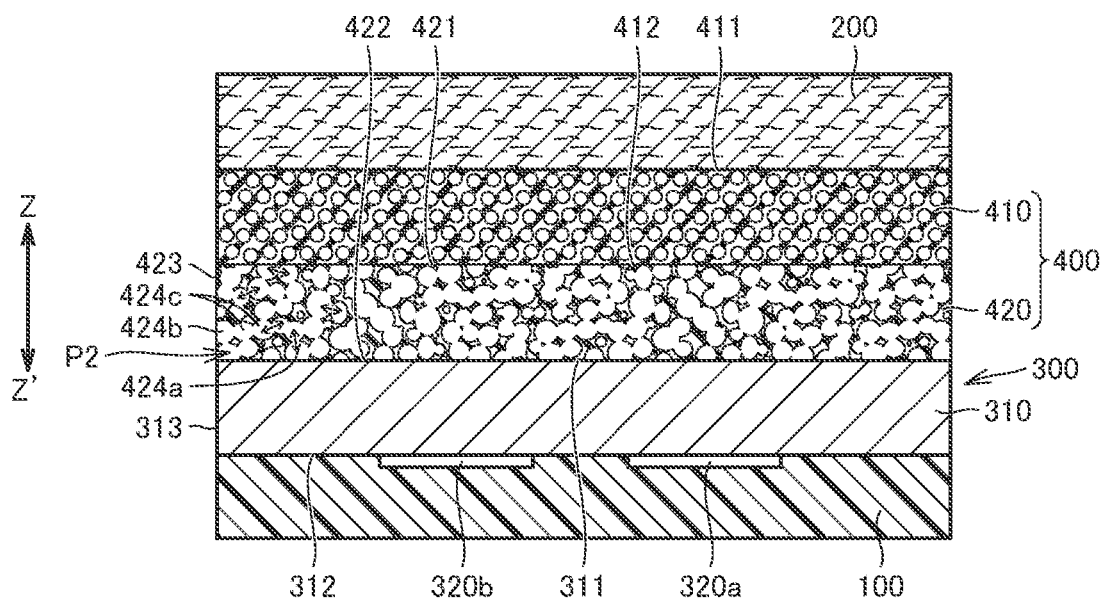
FIG. 5A is a schematic partially enlarged view, corresponding to FIG. 2B, of a sixth variant of the connector of the first embodiment.
Figure 5B:
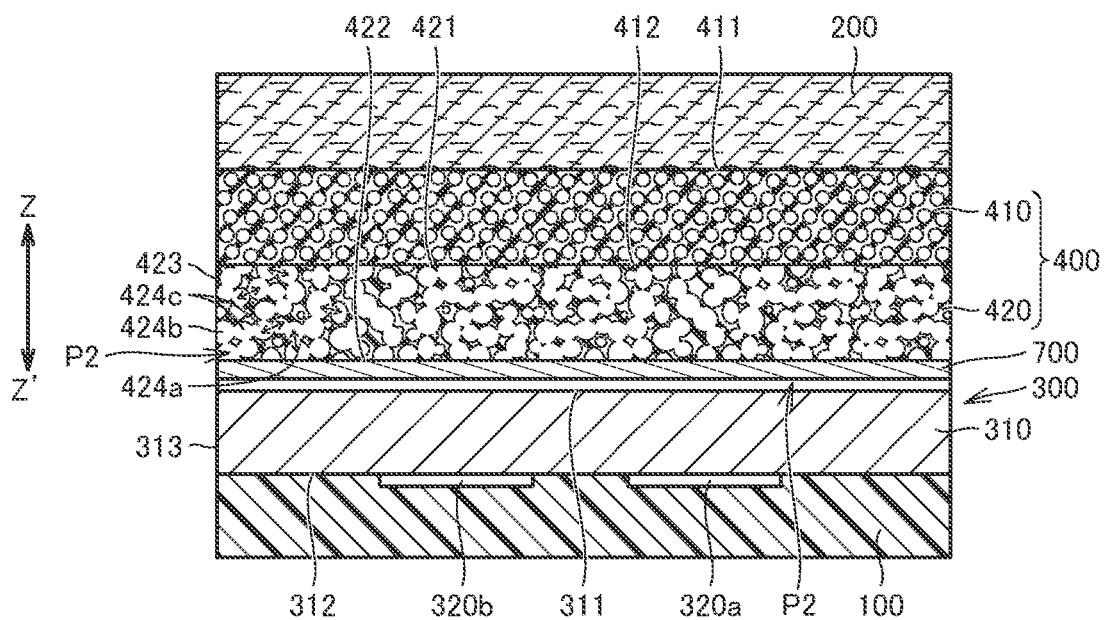
FIG. 5B is a schematic partially enlarged view, corresponding to FIG. 2B, of a seventh variant of the connector of the first embodiment.
Figure 6:
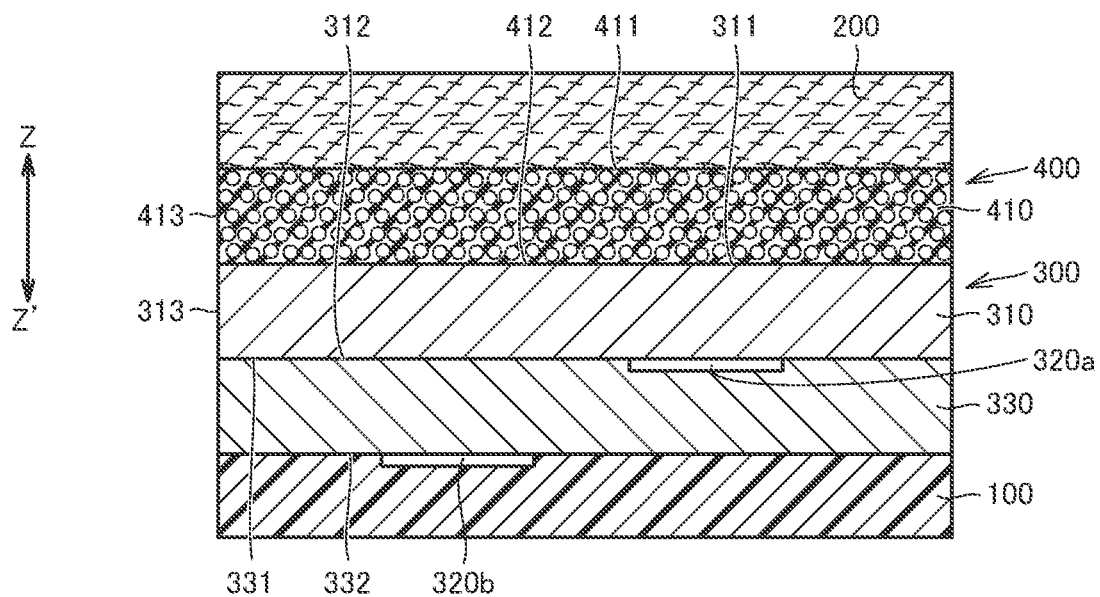
FIG. 6 is a schematic partially enlarged view, corresponding to FIG. 2B, of an eighth variant of the connector of the first embodiment.
Figure 7:
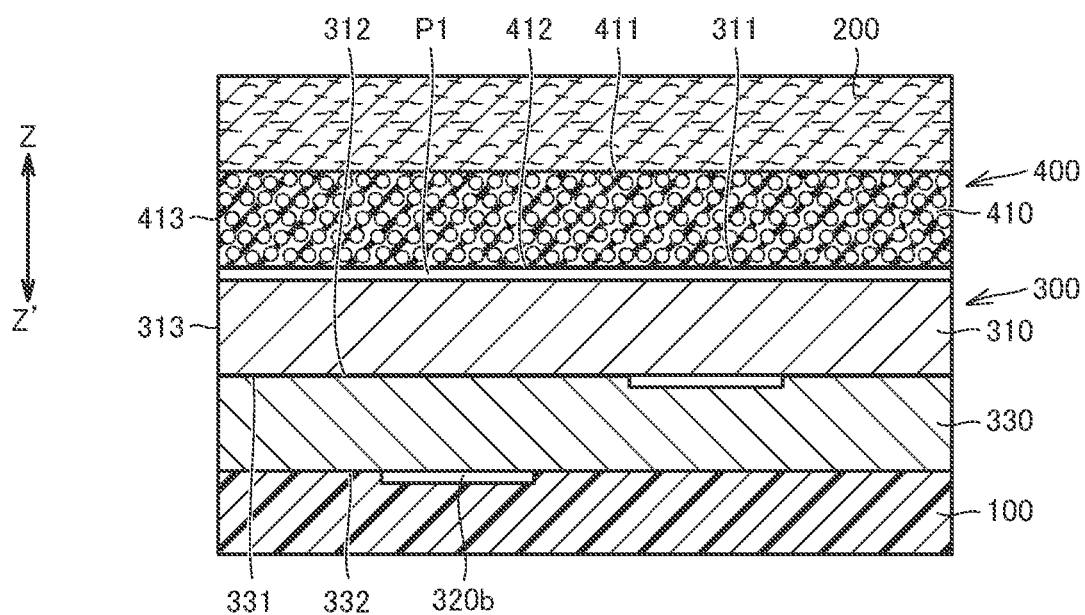
FIG. 7 is a schematic partially enlarged view, corresponding to FIG. 2B, of a ninth variant of the connector of the first embodiment.
Figure 8A:
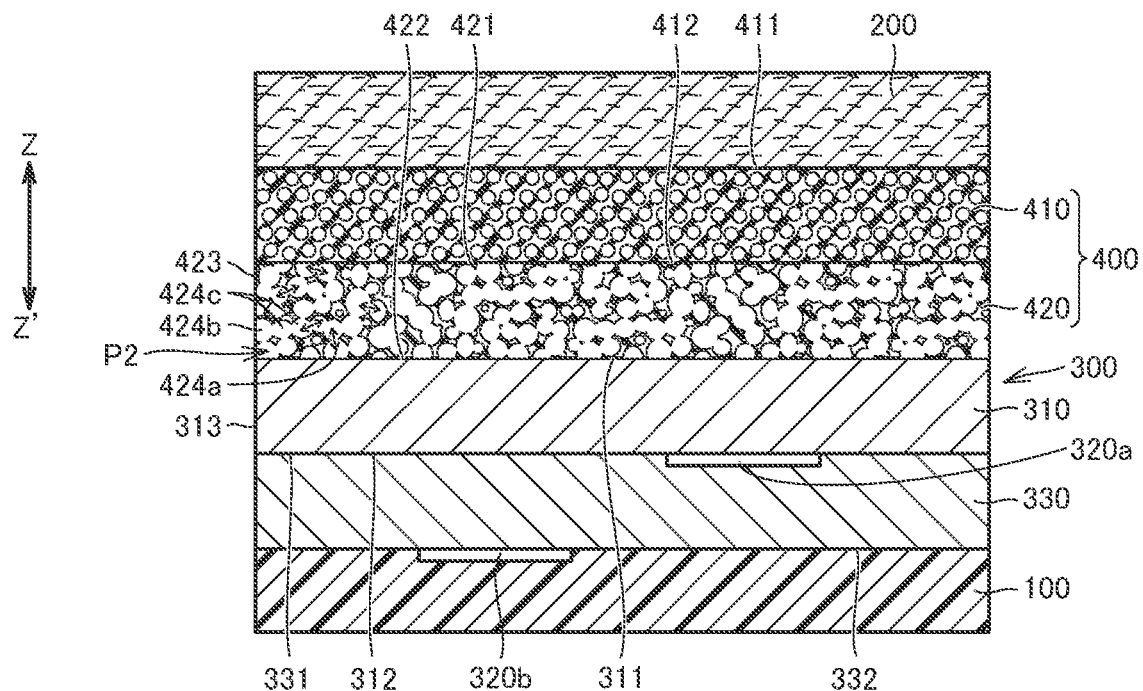
FIG. 8A is a schematic partially enlarged view, corresponding to FIG. 2B, of a tenth variant of the connector of the first embodiment.
Figure 8B:
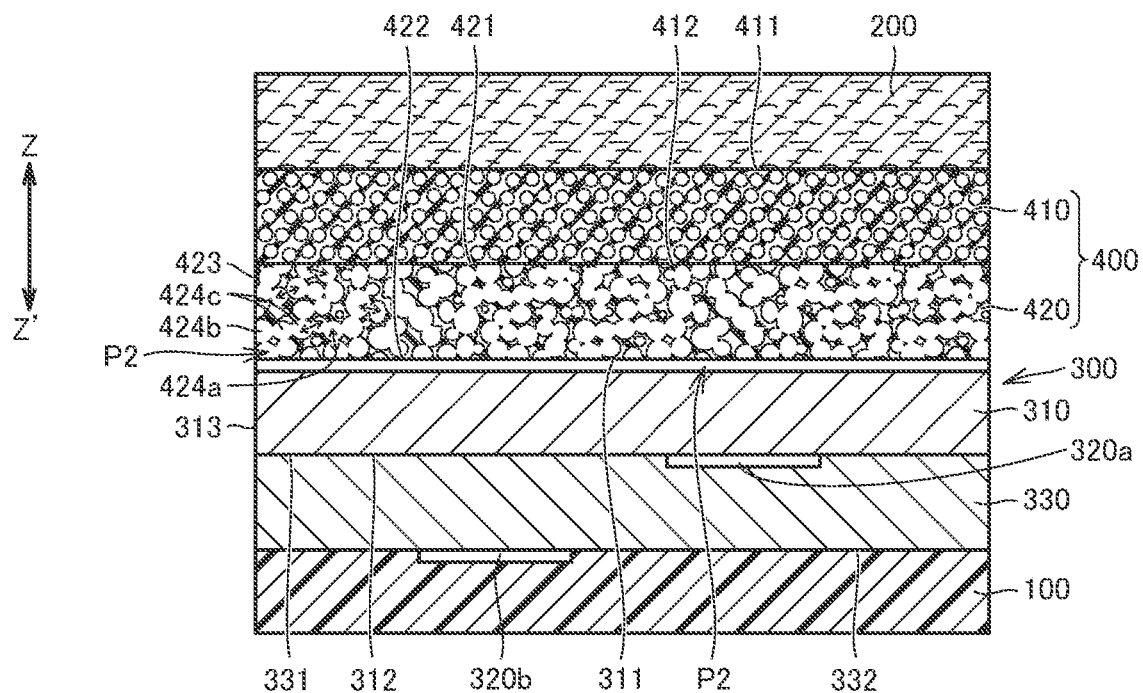
FIG. 8B is a schematic partially enlarged view, corresponding to FIG. 2B, of an eleventh variant of the connector of the first embodiment.

Hereinafter described is a touch sensing device D1 according to a plurality of embodiments, including the first embodiment and variants thereof, of the invention with reference to FIGS. 1 to 8B. FIGS. 1 to 2B illustrate the touch sensing device D1 according to the first embodiment. FIG. 3A illustrates a first variant of the touch sensing device D1 according to the first embodiment. FIG. 3B illustrates a second variant of the touch sensing device D1 according to the first embodiment. FIG. 3C illustrates a third variant of the touch sensing device D1 of the first embodiment. FIG. 4A illustrates a fourth variant of the touch sensing device D1 according to the first embodiment. FIG. 4B illustrates a fifth variant of the touch sensing device D1 according to the first embodiment. FIG. 5A illustrates a sixth variant of the touch sensing device D1 according to the first embodiment. FIG. 5B illustrates a seventh variant of the touch sensing device D1 according to the first embodiment. FIG. 6 illustrates an eighth variant of the touch sensing device D1 according to the first embodiment. FIG. 7 illustrates a ninth variant of the touch sensing device D1 according to the first embodiment. FIG. 8A illustrates a tenth variant of the touch sensing device D1 according to the first embodiment. FIG. 8B illustrates an eleventh variant of the touch sensing device D1 of the first embodiment. FIGS. 2A to 8B indicate a Z-Z' direction (first direction). The Z-Z' direction includes a Z direction (one side in the first direction) and a Z' direction (the other side in the first direction).

The touch sensing device D1 may be, for example, an interior part of an automobile (e.g., a console (see FIGS. 1 to 2A and 3A to 3C), an armrest, a seat, a dashboard, a steering wheel, an inner panel of a door, or a headliner (lining)); furniture (e.g., a sofa, a stool, a chair, a desk, a table, etc.); a portable information terminal, such as a smartphone; a stationary information terminal to be operated by a user (e.g., an automated teller machine (ATM), a ticket vending device, a reception terminal for making a loan contract for cash advances or the like services, a multimedia terminal for making a ticket reservation or a product purchase application, a vending machine, a point of sales (POS) terminal, a ticketing machine for issuing boarding passes or other tickets installed at an airport, a train station, etc., an amusement device (e.g., a pachinko machine, a slot machine in a pachinko parlor, a slot machine, an arcade game, or the like); or the like.

The touch sensing device D1 include a housing 100 and an outer layer 200. The housing 100 is a housing of an interior of an automobile, furniture, portable information terminal, fixed information terminal, or the like described above. The outer layer 200 is composed of a natural, artificial, or synthetic leather, a cloth of fibrous material, such as a woven fabric or knitted fabric, a synthetic resin film, or the like material. The outer layer 200 covers at least part of the housing 100. The outer layer 200 includes a touch region to be contacted by a detection target from the Z-direction side with, such as a human finger or a stylus. The touch region of the outer layer 200 may be provided with a through hole or holes, such as holes between stitches. Also, the touch region of the outer layer 200 may have a plurality of parts, adjacent ones of which may be joined together. In other words, the touch region may include a joint or joints between the parts. It is possible to omit the through hole or holes and/or the joint or joints of the touch region of the outer layer 200.

The touch sensing device D1 further includes a sensor 300. The sensor 300 is a capacitive touch sensor. The sensor 300 is supported by the housing 100. The sensor 300 is disposed between the housing 100 and the outer layer 200 covering the housing 100. The sensor 300 include at least one sensor layer. The at least one sensor layer includes a first sensor layer 310. It should be appreciated that the Z-Z' direction corresponds to the thickness direction of the sensor 300, and also corresponds to the thickness direction of the first sensor layer 310.

The first sensor layer 310 is a plate or film of synthetic resin, such as polycarbonate (PC) resin, polymethyl methacrylate (PMMA) resin, Acrylonitrile butadiene styrene (ABS) resin, polyethylene terephthalate (PET) resin, cycloolefin polymer (COP) resin, DURABIO (registered trademark) resin, or the like. The first sensor layer 310 includes a first main face 311 on the Z-direction side, a second main face 312 on the Z'-direction side, and a side face 313 intersecting the second main face 312.

Where the at least one sensor layer is a single sensor layer (see FIGS. 2B, 4A, 4B, and 5), the single sensor layer is the first sensor layer 310. In this case, the first sensor layer 310 is also the uppermost sensor layer on the most Z-direction side of the single sensor layer, and also the lowermost sensor layer on the most Z'-direction side of the single sensor layer. In this case, the first main face 311 of the first sensor layer 310 is a first main face on the Z-direction side of the sensor 300, and the second main face 312 of the first sensor layer 310 is a second main face on the Z'-direction side of the sensor 300.

Where the at least one sensor layer is a plurality of sensor layers (see FIGS. 6 to 8B), the sensor layers are laminated in the Z-Z' direction. The plurality of sensor layers includes the first sensor layer 310. The first sensor layer 310 may be any one of the sensor layers, such as the uppermost sensor layer on the most Z-direction side, or the lowermost sensor layer on the most Z'-direction side. The uppermost sensor layer includes a first main face on the Z-direction side, a second main face on the Z'-direction side, and a side face intersecting the second main face. In this case, the first main face of the uppermost sensor layer is a first main face on the Z-direction side of the sensor 300.

Where the uppermost sensor layer of any of the above aspects is the first sensor layer 310, the first main face of the uppermost sensor layer is the first main face 311 of the first sensor layer 310, the second main face of the uppermost sensor layer is the second main face 312 of the first sensor layer 310, and the side face of the uppermost sensor layer is the side face 313 of the first sensor layer 310.

The sensor 300 further include at least one first electrode 320a (see FIGS. 2B and 4A to 8B). The at least one first electrode 320a is at least one transparent conductive film or conductor provided on at least one face of the first main face 311 or the second main face 312 of the first sensor layer 310, and located on the Z'-direction side relative to the touch region of the outer layer 200. The or each first electrode 320a is configured such that signals (e.g., voltage or current) of the or each first electrode change in accordance with a change in capacitance caused by an approach of a detection target from the Z-direction side.

The at least one first electrode 320a may be a plurality of first electrodes 320a. The plurality of first electrodes 320a may be provided on the same one of the main faces (the first main face 311 or the second main face 312) of the first sensor layer 310. Alternatively, one or more of the first electrodes 320a may be provided on one of the first main face 311 and the second main face 312, and the remaining first electrode or electrodes 320a may be provided on the other main face.

The first electrode or electrodes 320a are electrically connected to a controller (not illustrated). The controller may be provided in the touch sensing device D1. Alternatively, the controller may not be provided in the touch sensing device D1 but built in the automobile, furniture, portable information terminal, fixed information terminal, or the like described above. For convenience of description, the "controller" herein refers to either the controller of the touch sensing device D1 or the controller provided outside the touch sensing device D1.

Where the sensor 300 is a self-capacitive touch sensor, the controller is configured to charge and discharge the first electrode or electrodes 320a. During the charge and discharge, a touch of a detection target on the touch region of the outer layer 200 from the Z-direction side (in other words, an approach of the detection target to the single first electrode 320a or at least one of the first electrodes 320a from the Z-direction side) causes a change in electrostatic capacitance between the detection target and the single first electrode 320a or the at least one of the first electrodes 320a. In accordance with the change in capacitance, signals (e.g., voltage or current) of the single first electrode 320a or the at least one of the first electrodes 320a change. The controller is configured to monitor signals of the first electrode or electrodes 320a and compare the signals with a first threshold on a memory of the controller. When the controller determines in the above comparison that any of the signals of the first electrode or the at least one of the first electrodes 320a exceed the first threshold, the controller determines that the detection target has touched a portion of the touch region on the Z-direction side relative to the first electrode or electrodes 320a that have the signals exceeding the first threshold.

The sensor 300 may further include at least one second electrode 320b (see FIGS. 2B and 4A to 8B). The at least one second electrode 320b is at least one transparent conductive film or conductor provided on at least one face of the first main face 311 or the second main face 312 of the first sensor layer 310, and located on the Z'-direction side relative to the touch region of the outer layer 200. The or each second electrode 320b may be disposed on the same main face of the first sensor layer 310 as, or on a different main face from, the face on which the at least one first electrode 320a is disposed (see FIGS. 2B, 4A, 4B, and 5).

The at least one second electrode 320b may be a plurality of second electrodes 320b. The plurality of second electrodes 320b may be provided on the same one of the main faces (the first main face 311 or the second main face 312) of the first sensor layer 310. Alternatively, one or more of the second electrodes 320b may be provided on one of the first main face 311 and the second main face 312 of the first sensor layer 310, and the remaining second electrode or electrodes 320b may be provided on the other main face. Where the sensor 300 is a self-capacitive touch sensor, the at least one second electrode 320b is omitted.

Where the at least one sensor layer of the sensor 300 is the plurality of sensor layers, the sensor layers may further include a second sensor layer 330 (see FIGS. 6 to 8B). The second sensor layer 330 is constituted by a plate or film similar to that constituting the first sensor layer 310. The second sensor layer 330 is located on the Z'-direction side relative to the first sensor layer 310. The second sensor layer 330 includes a first main face 331 on the Z-direction side and a second main face 332 on the Z'-direction side. The first main face 331 of the second sensor layer 330 may be bonded to the second main face 312 of the first sensor layer 310 with an optical clear adhesive (OCA) or the like means. There may be another sensor layer between the first main face 331 of the second sensor layer 330 and the second main face 312 of the first sensor layer 310. The second main face 332 of the second sensor layer 330 may be in surface contact with the housing 100. There may be another sensor layer between the second main face 332 of the second sensor layer 330 and the housing 100.

Where the at least one second electrode 320b and the second sensor layer 330 are provided, the at least one second electrode 320b may be provided not on the first sensor layer 310 but on at least one face of the first main face 331 and the second main face 332 of the second sensor layer 330 (see FIGS. 6 to 8B).

Where the at least one second electrode 320b is the plurality of second electrodes 320b, the second electrodes 320b may be provided on the same one of the main faces (the first main face 331 or the second main face 332) of the second sensor layer 330. Alternatively, one or more of the second electrodes 320b may be provided on one of the first main face 331 and the second main face 332, and the remaining electrode or second electrodes 320b may be provided on the other main face.

Where the sensor 300 is a mutual-capacitive touch sensor including the at least one first electrodes 320a and the at least one second electrodes 320b, it is preferable that the or each second electrode 320b be a drive electrode and the or each first electrode 320a be a detection electrode. The or each first electrode 320a is electrically connected to the controller, and the or each second electrode 320b is electrically connected to the controller. While the controller is supplying drive pulses to the second electrode or electrodes 320b, the detection target approaches the single first electrode 320a or the at least one of the first electrodes 320a and the single second electrode 320b or at least one of the second electrodes 320b from the Z-direction side, and there is a change in capacitance between the single first electrode 320a or the at least one of the first electrodes 320a and the single second electrode 320b or the at least one of the second electrodes 320b to cause a change in signals of the single first electrode 320a or the at least one of the first electrodes 320a. The controller is configured to supply drive pulses to the second electrode or electrodes 320b, monitor signals of the first electrode or electrodes 320a, and compare the signals with a second threshold on a memory of the controller. When the controller determines in the above comparison that the signals of the first electrode or the at least one of the first electrodes 320a exceeds the second threshold, the controller determines that the detection target has touched a portion in the touch region on the Z-direction side relative to the first electrode or electrodes 320a that have the signals exceeding the second threshold.

The sensor 300 may be a combined self-capacitive and mutual-capacitive sensor. In this case, while the controller is electrically charging and discharging the first electrode or electrodes 320a, there is a change in capacitance between a detection target approaching from the Z-direction side and the single first electrode 320a or at least one of the first electrodes 320a to cause a change of signals of the single first electrode 320a or the at least one of the first electrodes 320a. Also, while the controller is supplying drive pulses to the second electrode or electrodes 320b, the detection target approaches the single first electrode 320a or the at least one of the first electrodes 320a and the single second electrode 320b or at least one of the second electrodes 320b from the Z-direction side, and there is a change in capacitance between the single first electrode 320a or the at least one of the first electrodes 320a and the single second electrode 320b or the at least one of the second electrodes 320b to cause a change in signals of the single first electrode 320a or the at least one of the first electrodes 320a. The controller is configured to monitor signals (voltage or current) of the first electrode or electrodes 320a and compare the signals with a third threshold on a memory of the controller. When the controller determines in the above comparison that the signals of the first electrode or the at least one of the first electrodes 320a exceeds the third threshold, the controller determines that the detection target has touched a portion of the touch region that is on the Z-direction side relative to the first electrode or electrodes 320a that have the signals exceeding the third threshold.

The touch sensing device D1 further include at least one intermediate layer 400 (first intermediate layer) interposed between the outer layer 200 and the uppermost sensor layer of the sensor 300. The at least one intermediate layer 400 includes a water shielding layer 410. The water shielding layer 410 is composed of a waterproof elastic substance. The water shielding layer 410 is configured to be elastically deformed by being pressed through the touch region by a detection target from the Z-direction side. Also, the water shielding layer 410 only needs to have waterproofness satisfying the International Electrotechnical Commission rating (JIS C0920) of IPX1 or higher. The water shielding layer 410 may be composed of, for example, a closed-cell foam substance (e.g., general-purpose polyethylene foam, sponge rubber, or the like) having waterproofness described above. A closed-cell foam substance has a plurality of bubbles independent from each other and not communicating with each other. The water shielding layer 410 has a first main face 411 on the Z-direction side, a second main face 412 on the Z'-direction side, and a side face 413 intersecting the second main face 412. The water shielding layer 410 may further have one of configurations (1) to (4) described below.

(1) The water shielding layer 410 is smaller in projected area in a plan view from the Z-direction side (hereinafter referred to simply as "projected area in the plan view") than the outer layer 200 and than the sensor 300 (see FIG. 3A). In this case, the water shielding layer 410 is disposed between a part of the outer layer 200 and a part of the sensor 300, and covers the part of the sensor 300 from the Z-direction side. The first main face 411 of the water shielding layer 410 may be in contact with the part of the outer layer 200. Alternatively, there may be an interlayer member 700 (e.g., an adhesive layer, a double-sided tape, or the like) between the first main face 411 and the part of the outer layer 200. The second main face 412 of the water shielding layer 410 may be in contact with a part of the uppermost sensor layer of the sensor 300. Alternatively, there may be an interlayer member 700 (e.g., an adhesive layer, a double-sided tape, or the like) between the second main face 412 and the part of the uppermost sensor layer.

(2) The water shielding layer 410 is smaller in projected area in the plan view than the outer layer 200 and substantially as large in projected area in the plan view as the sensor 300 (see FIG. 3B). In this case, the water shielding layer 410 is disposed between a part of the outer layer 200 and the sensor 300, and covers the sensor 300 from the Z-direction side. For example, the water shielding layer 410 may be disposed between the part of the outer layer 200 (more particularly, the part of the outer layer 200 that is located on the Z-direction side relative to the sensor 300) and the entirety of the first main face of the uppermost sensor layer of the sensor 300, and may cover the entirety of the first main face of the uppermost sensor layer from the Z-direction side. The first main face 411 of the water shielding layer 410 may be in surface contact with the part of the outer layer 200 on the Z-direction side relative to the sensor 300. Alternatively, there may be an interlayer member (e.g., an adhesive layer, a double-sided tape, or the like) between the first main face 411 and the part of the outer layer 200 on the Z-direction side relative to the sensor 300. The second main face 412 of the water shielding layer 410 may be in surface contact with the entirety of the uppermost sensor layer. Alternatively, there may be an interlayer member (e.g., an adhesive layer, a double-sided tape, or the like) between the second main face 412 and the entirety of the uppermost sensor layer.

(3) The water shielding layer 410 is smaller in projected area in the plan view than the outer layer 200 and larger in projected area in the plan view than the sensor 300 (see FIG. 3C). In this case, the water shielding layer 410 is disposed between a part of the outer layer 200 and a combination of the entire sensor 300 and a part of the housing 100, and covers the sensor 300 from the Z-direction side. For example, the water shielding layer 410 may be disposed between the part of the outer layer 200 (more particularly, the part of the outer layer 200 on the Z-direction side relative to the sensor 300 and a peripheral part of the housing 100 surrounding the sensor 300) and a combination of the entirety of the first main face of the uppermost sensor layer of the sensor 300 and the peripheral part of the housing 100 surrounding the sensor 300, and cover the entirety of the first main face of the uppermost sensor layer from the Z-direction side. The first main face 411 of the water shielding layer 410 may be in surface contact with the part of the outer layer 200 on the Z-direction side relative to the sensor 300 and the peripheral part of the housing 100. Alternatively, there may be an interlayer member (e.g., an adhesive layer, a double-sided tape, or the like) between the first main face 411 and the part of the outer layer 200 on the Z-direction side relative to the sensor 300 and the peripheral part of the housing 100. The second main face 412 of the water shielding layer 410 may be in surface contact with the combination of the entirety of the uppermost sensor layer and the peripheral part of the housing 100. Alternatively, there may be an interlayer member (e.g., an adhesive layer, a double-sided tape, or the like) between the second main face 412 and the combination of the entirety of the uppermost sensor layer and the peripheral part of the housing 100.

(4) The water shielding layer 410 is substantially as large in projected area in the plan view as the outer layer 200 and larger in projected area in the plan view than the sensor 300 (see FIG. 2A). In this case, the water shielding layer 410 is disposed between the outer layer 200 and a combination of the entire sensor 300 and at least part of the housing 100, and covers the sensor 300 from the Z-direction side. The first main face 411 of the water shielding layer 410 may be in surface contact with the entire face on the Z'-direction side of the outer layer 200 (see FIGS. 2B, 4A, and 4B). Alternatively, there may be an interlayer member (e.g., an adhesive layer, a double-sided tape, or the like) between the first main face 411 and the entire face on the Z'-direction side of the outer layer 200. The second main face 412 of the water shielding layer 410 may be in surface contact with the combination of the entirety of the first main face of the uppermost sensor layer of the sensor 300 and the at least part of the housing 100 (see FIGS. 2B and 4A). Alternatively, there may be an interlayer member (e.g., an adhesive layer, a double-sided tape, or the like) between the second main face 412 and the combination of the entirety of the first main face of the uppermost sensor layer and the at least part of the housing 100 (see FIG. 4B).

Where the touch region of the outer layer 200 is provided with the through hole(s) and/or the joint(s) described above, the first main face 411 of the water shielding layer 410 may be in contact with the outer layer 200 in one of manners (1) to (4) described above to block the through hole(s) and/or the joint(s) of the outer layer 200.

The touch sensing device D1 may further include at least one exhaust path P1. The at least one exhaust path P1 may be provided in at least one face of the second main face 412 of the water shielding layer 410 or the first main face of the uppermost sensor layer (e.g., the first main face 311 of the first sensor layer 310) (see FIGS. 4A and 7). In this case, the at least one exhaust path P1 is at least one through hole or groove extending along the at least one face, opening out to the at least one surface (to at least one of the Z- and Z'-direction sides), and opening out to a side face or faces (e.g., the side face 413 of the water shielding layer 410 and/or the side face 313 of the first sensor layer 310) intersecting the at least one face. Where the uppermost sensor layer is subjected to surface treatment such as overcoating (i.e., where the uppermost sensor layer includes a surface-treated portion), the surface-treated portion of the uppermost sensor layer has the first main face and/or the second main face. In this case, the at least one exhaust path P1 may be a through hole or groove provided in the first main face of the surface-treated portion of the uppermost sensor layer and configured as described above. When the second main face 412 of the water shielding layer 410 is brought into surface contact with, or bonded via the interlayer member 700 to, the first main face of the uppermost sensor layer, air sandwiched between these two main faces moves through the exhaust path or paths P1 and is exhausted to the outside from at least one of the side face 413 of the water shielding layer 410 or the side face of the uppermost sensor layer. The provision of the at least one exhaust path P1 thus reduces the possibility that air becomes trapped between the second main face 412 of the water shielding layer 410 and the first main face of the uppermost sensor layer. Alternatively, the at least one exhaust path P1 may be provided in the interlayer member 700 (see FIG. 4B). The at least one exhaust path P1 is at least one through hole or groove extending along at least one face of the second main face 412 of the water shielding layer 410 or the first main face of the uppermost sensor layer (e.g., the first main face 311 of the first sensor layer 310), opening out to the at least one face (to at least one of the Z- and Z'-direction sides), and opening out to the side face of the interlayer member 700. When the second main face 412 of the water shielding layer 410 is bonded via the interlayer member 700 to the first main face of the uppermost sensor layer, air sandwiched between these two main faces moves through the exhaust path or paths P1 and is exhausted to the outside from the side face of the interlayer member 700. The provision of the at least one exhaust path P1 of this aspect also reduces the possibility that air becomes trapped between the second main face 412 of the water shielding layer 410 and the first main face of the uppermost sensor layer. It should be note that the at least one exhaust path P1 may be a plurality of exhaust paths P1. Each of the exhaust paths P1 only needs to have at least one of the configurations described above. The at least one exhaust path P1 can be omitted (see FIG. 3).

The at least one intermediate layer 400 may further include an exhaust layer 420 (see FIGS. 5A, 5B, 8A, and 8B). The exhaust layer 420 may be composed of an open-cell foam substance (e.g., urethane foam or the like) inside of which a plurality of interconnected bubbles is provided. The exhaust layer 420 may alternatively be a plate or film similar to the first sensor layer 310. The exhaust layer 420 has a first main face 421 on the Z-direction side, a second main face 422 on the Z'-direction side, and a side face 423 intersecting the second main face 422. The exhaust layer 420 is substantially as large in projected area in the plan view as the water shielding layer 410. Where the exhaust layer 420 is composed of an open-cell foam substance, the exhaust layer 420 is configured to be elastically deformed by being pressed through the touch region by a detection target from the Z-direction side.

Where the water shielding layer 410 has configuration (1) above, the exhaust layer 420 is smaller in projected area in the plan view than the sensor 300 (see FIG. 3A). In this case, the exhaust layer 420 is disposed between the water shielding layer 410 and the part of the sensor 300. The first main face 421 of the exhaust layer 420 may be in surface contact with the second main face 412 of the water shielding layer 410 (See FIGS. 5A, 8A, and 8B). Alternatively, there may be an interlayer member 700 (e.g., an adhesive layer, a double-sided tape, or the like) between the first main face 421 of the exhaust layer 420 and the second main face 412 of the water shielding layer 410. The second main face 422 of the exhaust layer 420 is in contact with the part of the sensor 300.

Where the water shielding layer 410 has configuration (2) above, the exhaust layer 420 is substantially as large in projected area in the plan view as the sensor 300 (see FIG. 3B). In this case, the exhaust layer 420 is disposed between the water shielding layer 410 and the sensor 300 and covers the sensor 300 from the Z-direction side. For example, the exhaust layer 420 may be disposed between the entirety of the second main face 412 of the water shielding layer 410 and the entirety of the first main face of the uppermost sensor layer of the sensor 300, and cover the entirety of the first main face of the uppermost sensor layer from the Z-direction side. The first main face 421 of the exhaust layer 420 may be in surface contact with the entirety of the second main face 412 of the water shielding layer 410 (See FIGS. 5A, 8A, and 8B). Alternatively, there may be an interlayer member 700 (e.g., an adhesive layer, a double-sided tape, or the like) between the first main face 421 of the exhaust layer 420 and the second main face 412 of the water shielding layer 410. The second main face 422 of the exhaust layer 420 is in surface contact with the entirety of the first main face of the uppermost sensor layer of the sensor 300.

Where the water shielding layer 410 has configuration (3) above, the exhaust layer 420 is larger in projected area in the plan view than the sensor 300 and smaller in projected area in the plan view than the outer layer 200 (see FIG. 3C). In this case, the exhaust layer 420 is disposed between a combination of the water shielding layer 410 and a part of the outer layer 200 and a combination of the sensor 300 and a part of the housing 100, and covers the sensor 300 from the Z-direction side. For example, the exhaust layer 420 may be disposed between a combination of the entirety of the second main face 412 of the water shielding layer 410 and the part of the outer layer 200 (more particularly, the peripheral part of the outer layer 200 surrounding the water shielding layer 410) and a combination of the entirety of the first main face of the uppermost sensor layer of the sensor 300 and the part of the housing 100 (more particularly, the peripheral part of the housing 100 surrounding the sensor 300), and cover the entirety of the first main face of the uppermost sensor layer from the Z-direction side. The first main face 421 of the exhaust layer 420 may be in surface contact with the combination of the entirety of the second main face 412 of the water shielding layer 410 and the peripheral part of the outer layer 200 surrounding the water shielding layer 410 (see FIGS. 5A, 8A, and 8B). Alternatively, there may be an interlayer member (e.g., an adhesive layer, a double-sided tape, or the like) between the first main face 421 of the exhaust layer 420 and the combination of the entirety of the second main face 412 of the water shielding layer 410 and the peripheral part of the outer layer 200 surrounding the water shielding layer 410. The second main face 422 of the exhaust layer 420 is in surface contact with the entirety of the first main face of the uppermost sensor layer of the sensor 300 and the peripheral part of the housing 100 surrounding the sensor 300.

Where the water shielding layer 410 has configuration (4) above, the exhaust layer 420 is substantially as large in projected area in the plan view as the outer layer 200 and is larger in projected area in the plan view than the sensor 300 (see FIG. 2A). In this case, the exhaust layer 420 is disposed between a combination of the water shielding layer 410 and the outer layer 200 and a combination of the sensor 300 and at least part of the housing 100, and covers the sensor 300 from the Z'-direction side. For example, the exhaust layer 420 may be disposed between the entirety of the second main face 412 of the water shielding layer 410 and a combination of the entirety of the first main face of the uppermost sensor layer of the sensor 300 and the at least part of the housing 100, and cover the entirety of the first main face of the uppermost sensor layer from the Z'-direction side. The first main face 421 of the exhaust layer 420 may be in surface contact with the entirety of the second main face 412 of the water shielding layer 410 (see FIGS. 5A, 8A, and 8B). Alternatively, there may be an interlayer member 700 (e.g., an adhesive layer, a double-sided tape, or the like) between the first main face 421 of the exhaust layer 420 and the entirety of the second main face 412 of the water shielding layer 410. The second main face 422 of the exhaust layer 420 is in surface contact with the entirety of the first main face of the uppermost sensor layer of the sensor 300 and the at least part of the housing 100.

The touch sensing device D1 may further include at least one exhaust path P2. The at least one exhaust path P may be provided in at least one face of the second main face 422 of the exhaust layer 420 or the first main face of the uppermost sensor layer (e.g., the first main face 311 of the first sensor layer 310) (see FIG. 8B). The at least one exhaust path P2 opens out to the at least one face (to at least one of the Z- and Z'-direction sides) and opens out to a side face or faces (e.g., the side face 423 of the exhaust layer 420 and/or the side face 313 of the first sensor layer 310) intersecting the at least one face. Where the uppermost sensor layer includes the surface-treated portion, the at least one exhaust path P2 may be a through hole or groove provided in the first main face of the surface-treated portion of the uppermost sensor layer and configured as described above. When the second main face 422 of the exhaust layer 420 is brought into surface contact with, or bonded via the interlayer member 700 to, the first main face of the uppermost sensor layer, air sandwiched between these two main faces moves through the exhaust path or paths P2 and is exhausted to the outside from at least one of the side face 423 of the exhaust layer 420 or the side face of the uppermost sensor layer. The provision of the at least one exhaust path P2 thus reduces the possibility that air becomes trapped between the second main face 412 of the exhaust layer 420 and the first main face of the uppermost sensor layer. Alternatively, the at least one exhaust path P2 may be provided in the interlayer member 700 (see FIG. 5B). In this case, the at least one exhaust path P2 is at least one through hole or groove extending along at least one face of the second main face 422 of the exhaust layer 420 or the first main face of the uppermost sensor layer (e.g., the first main face 311 of the first sensor layer 310), opening out to the at least one face side (to at least one of the Z- and Z'-direction sides), and opening out to the side face of the interlayer member 700. When the second main face 422 of the exhaust layer 420 is bonded via the interlayer member 700 to the first main face of the uppermost sensor layer, air sandwiched between these two main faces moves through the exhaust path or paths P2 and is exhausted to the outside from the side face of the interlayer member 700. The provision of the at least one exhaust path P2 of this aspect also reduces the possibility that air becomes trapped between the second main face 422 of the exhaust layer 420 and the first main face of the uppermost sensor layer.

It should be appreciated that the interlayer member 700 described above is not limited to an adhesive layer or a double-sided tape, but may be any member to be sandwiched between two layers.

Where the exhaust layer 420 is composed of an open-cell foam substance (see FIGS. 5A, 5B, 8A, and 8B), the plurality of bubbles in the exhaust layer 420 include at least one first bubble 424a, at least one second bubble 424b, and at least one third bubble 424c. The at least one first bubble 424a is provided in, and opens out to, the second main face 422 of the exhaust layer 420. The at least one second bubble 424b is provided in, and opens out to, the side face 423 of the exhaust layer 420.

Where the at least one first bubble 424a is a single first bubble 424a, the at least one second bubble 424b is a single second bubble 424b, and the at least one third bubble 424c is one or more third bubbles 424c, the single first bubble 424a and the single second bubble 424b are connected by, and communicate with each other through, the one or more third bubbles 424c. In this case, the at least one exhaust path P2 is a single exhaust path P2 constituted by the single first bubble 424a, the single second bubble 424b, and the one or more third bubbles 424c.

Where the at least one first bubble 424a is a plurality of first bubbles 424a, the at least one second bubble 424b is a plurality of second bubbles 424b, and the at least one third bubble 424c is a plurality of third bubbles 424c, each of the first bubbles 424a and each of the second bubbles 424b are connected by, and communicate with each other through, one or more of the third bubbles 424c. In this case, the at least one exhaust path P2 is a plurality of exhaust paths P2, each of which is constituted by one of the first bubbles 424a, one of the second bubbles 424b, and one or more of the third bubbles 424c.

Where a plurality of exhausts path P2 is provided, each of the exhaust paths P2 only needs to have at least one of the configurations described above. The exhaust layer 420 can be omitted.

The touch sensing device D1 configured as described above provides the following technical features and effects (1) to (3).

Technical feature and effect (1): The touch sensing device D1 has improved waterproofness for the reasons described below. The water shielding layer 410 of the at least one intermediate layer 400 covers at least part of the sensor 300 from the Z-direction side. Even if liquid, such as water or sweat, enters through a scratch or rip in the outer layer 200 made due to aging or other causes, the water shielding layer 410 blocks liquid from the Z-direction side to reduce the possibility of the liquid adhering to the sensor 300. Also, where the outer layer 200 is provided with the through hole(s) and/or the joint(s), the water shielding layer 410 of the at least one intermediate layer 400 blocks the through hole(s) and/or the joint(s) of the outer layer 200 to reduce the possibility of the liquid entering through the through hole(s) and/or the joint(s) of the outer layer 200. Further, where the projected area in the plan view of the water shielding layer 410 is substantially as large as, or larger than, that of the sensor 300, and the water shielding layer 410 covers the entire sensor 300 from the Z-direction side, the water shielding layer 410 blocks liquid from the Z-direction side to further reduce the possibility of the liquid adhering to the sensor 300. Moreover, the water shielding layer 410 of the at least one intermediate layer 400 is composed of a waterproof elastic substance, making it possible to increase the dimension in the Z-Z' direction of the water shielding layer 410, as compared with a case where the at least one intermediate layer includes a water shielding layer being waterproof but not elastic and an additional elastic part. The increase in the dimension in the Z-Z' direction of the water shielding layer 410 further improves the waterproofness of the touch sensing device D1.

Technical feature and effect (2): The water shielding layer 410 of the at least one intermediate layer 400, located on the Z'-direction side relative to the outer layer 200, is configured to be elastically deformed by a detection target touching the touch region of the outer layer 200. This configuration provides an improved feeling to a user when operating the touch sensing device D1. Also, where the at least one intermediate layer 400 further includes the exhaust layer 420 being an open-cell foam substance, the water shielding layer 410 and the exhaust layer 420 of the at least one intermediate layer 400, located on the Z'-direction side relative to the outer layer 200, are configured to be elastically deformed by a detection target touching the touch region of the outer layer 200. This configuration provides a further improved feeling to a user when operating the touch sensing device D1.

Technical feature and effect (3): Where the at least one exhaust path P1 is provided, when the second main face 412 of the water shielding layer 410 is brought into surface contact with the first main face of the uppermost sensor layer of the sensor 300, air sandwiched between the second main face 412 of the water shielding layer 410 and the first main face of the uppermost sensor layer is exhausted through the at least one exhaust path P1 to the outside. This configuration reduces the possibility of air being kept sandwiched between the second main face 412 of the water shielding layer 410 and the first main face of the uppermost sensor layer. Also where the at least one exhaust path P2 is provided, when the second main face 422 of the exhaust layer 420 is brought into surface contact with the first main face of the uppermost sensor layer of the sensor 300, air sandwiched between the second main face 422 of the exhaust layer 420 and the first main face of the uppermost sensor layer is exhausted through the at least one exhaust path P2 to the outside. This configuration reduces the possibility of air being kept sandwiched between the second main face 422 of the exhaust layer 420 and the first main face of the uppermost sensor layer.

Second Embodiment

Figure 9A:
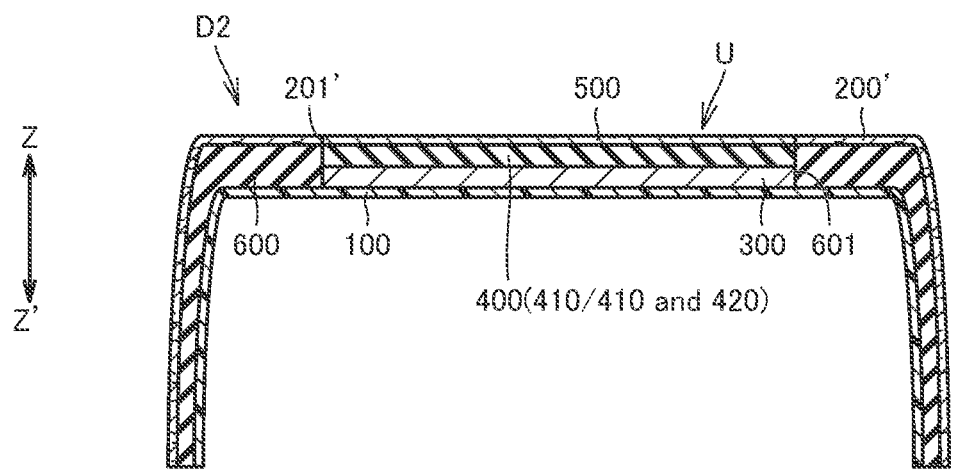
FIG. 9A is a schematic end view, corresponding to FIG. 2A, of a touch sensing device according to a second embodiment of the invention.
Figure 9B:
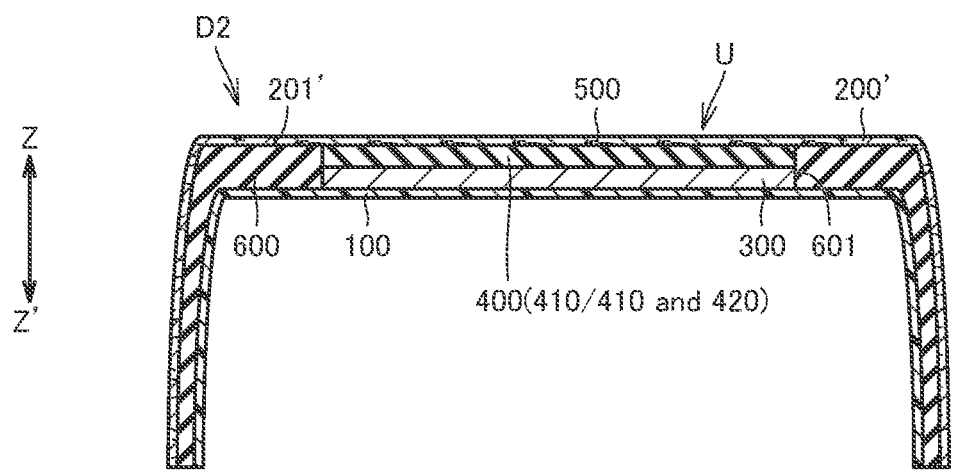
FIG. 9B is a schematic end view, corresponding to FIG. 2A, of a first variant of the connector of the second embodiment.
Figure 9C:
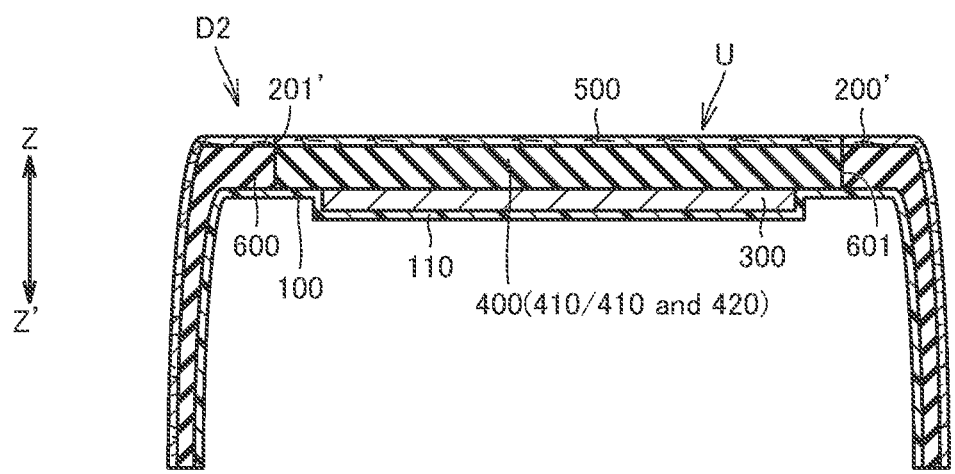
FIG. 9C is a schematic end view, corresponding to FIG. 2A, of a second variant of the connector of the second embodiment.

Hereinafter described is a touch sensing device D2 according to a plurality of embodiments, including a second embodiment and variants thereof, of the invention with reference to FIGS. 9A to 9C. FIG. 9A illustrates the touch sensing device D2 according to the second embodiment. FIG. 9B illustrates a first variant of the touch sensing device D2 according to the second embodiment. FIG. 9C illustrates a second variant of the touch sensing device D2 according to the second embodiment. FIGS. 9A to 9C also indicate the Z-Z' direction, similarly to the touch sensing device D1.

The touch sensing device D2 has the same configuration as the touch sensing device D1 except the following differences: (a) an outer layer 200' of the touch sensing device D2 is provided with an opening 201', not with the touch region, and (b) the touch sensing device D2 further includes a cover 500 and an intermediate layer 600 (second intermediate layer). The touch sensing device D2 will now be described focusing on these differences from the touch sensing device D1 and omitting overlapping descriptions.

The cover 500 is composed of a natural, artificial, or synthetic leather, a cloth of fibrous material, such as a woven fabric or knitted fabric, a synthetic resin film, or the like material. The cover 500 includes a touch region to be touched from the Z-direction side with a detection target, such as a human finger or a stylus. The touch region of the cover 500 may be provided with a through hole or holes, such as holes between stitches. Also, the touch region of the cover 500 may have a plurality of parts, adjacent ones of which may be joined together. In other words, the touch region may have a joint or joints between the parts. It is possible to omit the through hole or holes and/or the joint or joints of the touch region of the cover 500.

The cover 500 have an outer shape of a projected area in the plan view from the Z-direction side (hereinafter referred to simply as "outer shape of the projected area in the plan view"). The outer shape of the projected area in the plan view of the cover 500 may be the same as that of the or each intermediate layer 400. In this case, the cover 500 is substantially as large in projected area as the or each intermediate layer 400 (see FIGS. 9A and 9C), or larger in projected area in the plan view than the or each intermediate layer 400 (see FIG. 9B). Alternatively, the outer shape of the projected area in the plan view of the cover 500 may be different from that of the or each intermediate layer 400. In this case, the cover 500 is larger in projected area in the plan view than the or each intermediate layer 400 (see FIG. 9B). In either case, the cover 500 may be in surface contact with the first main face 411 of the water shielding layer 410 of the at least one intermediate layer 400 from the Z-direction side. Alternatively, there may be an additional layer of the at least one intermediate layer 400 between the cover 500 and the water shielding layer 410 of the at least one intermediate layer 400, and the cover 500 may be disposed so as to cover the first main face 411 of the water shielding layer 410 from the Z-direction side. The cover 500, the at least one intermediate layer 400, and a sensor 300 are laminated in this order in the Z-Z' direction to form a unit. For convenience of description, this unit will be referred to as a sensor unit U.

The opening 201' of the outer layer 200' passes through the outer layer 200' in the Z-Z' direction. The opening 201' has a shape of a projected area in the plan view that is substantially the same as the outer shape of the projected area in the plan view of the cover 500, and the opening 201' is substantially as large in projected area in the plan view as the cover 500 (see FIGS. 9A to 9C). The opening 201' is substantially as large in dimension in the Z-Z' direction as the cover 500.

The intermediate layer 600 may have the same configuration as the at least one intermediate layer 400, except that the intermediate layer 600 is interposed between the outer layer 200' and a housing 100 and has an accommodation hole 601. The accommodation hole 601 is a through hole passing through the intermediate layer 600 in the Z-Z' direction or a blind hole opened in the Z direction and closed in the Z' direction. The accommodation hole 601 is located on the Z'-direction side relative to, and communicates with, the opening 201'.

The accommodation hole 601 may have a shape of a projected area in the plan view that is substantially the same as the outer shape of the projected area in the plan view of the or each intermediate layer 400 and as that of the sensor 300 of the sensor unit U. The accommodation hole 601 may be substantially as large in projected area in the plan view as the or each intermediate layer 400 and as the sensor 300 of the sensor unit U. The accommodation hole 601 may have a dimension in the Z-Z' direction as that is substantially the same as the sum of the dimensions in the Z-Z' direction of the at least one intermediate layer 400 and the sensor 300 of the sensor unit U.

Where the accommodation hole 601 is a through hole, the housing 100 may be provided with an accommodation recess 110. The accommodation recess 110 is located on the Z'-direction side relative to, and communicates with, the accommodation hole 601. In this case, the accommodation recess 110 has a shape of a projected area in the plan view that is substantially the same as the outer shape of the projected area in the plan view of the sensor 300 of the sensor unit U, the accommodation recess 110 is substantially as large in projected area in the plan view as the sensor 300 of the sensor unit U, and the accommodation recess 110 is substantially as large in dimension in the Z-Z' direction as the sensor 300 of the sensor unit U. Also, the accommodation hole 601 has a shape of a projected area in the plan view that is substantially the same as the outer shape of the projected area in the plan view of the or each intermediate layer 400 of the sensor unit U, the accommodation hole 601 is substantially as large in projected area in the plan view as the or each intermediate layer 400 of the sensor unit U, and the accommodation hole 601 is substantially as large in dimension in the Z-Z' direction as the at least one intermediate layer 400 of the sensor unit U.

Where the cover 500, the or each intermediate layer 400, and the sensor 300 is substantially as large as each other in projected area in the plan view, and the accommodation recess 110 is not provided (see FIG. 9A), the opening 201' accommodates the cover 500 of the sensor unit U, and the accommodation hole 601 accommodates the at least one intermediate layer 400 and the sensor 300 of the sensor unit U.

Where the cover 500, the or each intermediate layer 400, and the sensor 300 is substantially as large as each other in projected area in the plan view, and the accommodation recess 110 is provided (not illustrated), the opening 201' accommodates the cover 500 of the sensor unit U, the accommodation hole 601 accommodates the at least one intermediate layer 400 of the sensor unit U, and the accommodation recess 110 accommodates the sensor 300 of the sensor unit U.

Where the cover 500 is larger in projected area in the plan view than the or each intermediate layer 400 and than the sensor 300, the or each intermediate layer 400 is substantially as large in projected area in the plan view as the sensor 300, and the accommodation recess 110 is not provided (see FIG. 9B), the opening 201' accommodates the cover 500 of the sensor unit U, a peripheral part of the cover 500 surrounding the at least one intermediate layer 400 is in contact with and covers a peripheral part of the intermediate layer 600 surrounding the accommodation hole 601 from the Z direction, and the accommodation hole 601 accommodates the at least one intermediate layer 400 and the sensor 300 of the sensor unit U.

Where the cover 500 is larger in projected area in the plan view than the or each intermediate layer 400 and than the sensor 300, the or each intermediate layer 400 is substantially as large in projected area in the plan view as the sensor 300, and the accommodation recess 110 is provided (not illustrated), the opening 201' accommodates the cover 500 of the sensor unit U, a peripheral part of the cover 500 surrounding the at least one intermediate layer 400 is in contact with and covers a peripheral part of the accommodation hole 601 of the intermediate layer 600 from the Z direction, the accommodation hole 601 accommodates the at least one intermediate layer 400 of the sensor unit U, and the accommodation recess 110 accommodates the sensor 300 of the sensor unit U.

Where the cover 500 is substantially as large in projected area in the plan view as the or each intermediate layer 400, the cover 500 and the at least one intermediate layer 400 are each larger in projected area in the plan view than the sensor 300, and the accommodation recess 110 is not provided (not illustrated), the accommodation hole 601 includes a first hole on the Z-direction side and a second hole on the Z'-direction side. The opening 201' accommodates the cover 500 of the sensor unit U, the first hole of the accommodation hole 601 accommodates the least one intermediate layer 400 of the sensor unit U, a peripheral part of the at least one intermediate layer 600 surrounding the sensor 300 is in contact with and covers a peripheral part of the second hole of the accommodation hole 601 from the Z direction, and the second hole of the accommodation hole 601 accommodates the sensor 300 of the sensor unit U.

Where the cover 500 is substantially as large in projected area in the plan view as the or each intermediate layer 400, the cover 500 and the at least one intermediate layer 400 are each larger in projected area in the plan view than the sensor 300, and the accommodation recess 110 is provided (see FIG. 9C), the opening 201' accommodates the cover 500 of the sensor unit U, the accommodation hole 601 accommodates the least one intermediate layer 400 of the sensor unit U, a peripheral part of the at least one intermediate layer 600 surrounding the sensor 300 is in contact with and covers a peripheral part of the accommodation recess 110 of the housing 100 from the Z direction, and the accommodation recess 110 accommodates the sensor 300 of the sensor unit U.

It should be noted that a face on the Z-direction side of the peripheral part of the opening 201' of the outer layer 200' may be flush with, or may be different in height position from, a face on the Z-direction side of the cover 500.

The touch sensing device D2 configured as described above provides the following technical features and effects (1) to (4).

Technical feature and effect (1): The touch sensing device D2 has improved waterproofness for the reasons described below. The water shielding layer 410 of the at least one intermediate layer 400 covers at least part of the sensor 300 from the Z-direction side. Even if liquid, such as water or sweat, enters through a scratch or rip in the cover 500 made due to aging or other causes, the water shielding layer 410 blocks liquid from the Z-direction side to reduce the possibility of the liquid adhering to the sensor 300. Also, where the cover 500 is provided with the through hole(s) and/or the joint(s), the water shielding layer 410 of the at least one of intermediate layer 400 blocks the through hole(s) and/or the joint(s) of the cover 500 to reduce the possibility of the liquid entering through the through hole(s) and/or the joint(s) of the cover 500. Further, where the projected area in the plan view of the water shielding layer 410 of the at least one intermediate layer 400 is substantially as large as, or larger than, that of the sensor 300, and the water shielding layer 410 covers the entire sensor 300 from the Z-direction side, the water shielding layer 410 blocks liquid from the Z-direction side to further reduce the possibility of the liquid adhering to the sensor 300. Moreover, the water shielding layer 410 of the at least one intermediate layer 400 is composed of a waterproof elastic substance, making it possible to increase the dimension in the Z-Z' direction of the water shielding layer 410, as compared with a case where the at least one intermediate layer includes a water shielding layer being waterproof but not elastic and an additional elastic part. The increase in the dimension in the Z-Z' direction of the water shielding layer 410 further improves the waterproofness of the touch sensing device D2.

Technical feature and effect (2): The water shielding layer 410 of the at least one intermediate layer 400, located on the Z'-direction side relative to the cover 500, is configured to be elastically deformed by a detection target touching the touch region of the cover 500. This configuration provides an improved feeling to a user when operating the touch sensing device D2. Also, where the at least one intermediate layer 400 further includes the exhaust layer 420 being an open-cell foam substance, the water shielding layer 410 and the exhaust layer 420 of the at least one intermediate layer 400, located on the Z'-direction side relative to the cover 500, are configured to be elastically deformed by a detection target touching the touch region of the cover 500. This configuration provides a further improved feeling to a user when operating the touch sensing device D2.

Technical feature and effect (3): The touch sensing device D2 provides a similar technical feature and effect to the technical feature and effect (3) of the touch sensing device D1.

Technical feature and effect (4): The sensor unit U of the touch sensing device D2 can be assembled into the outer layer 200', the intermediate layer 600, and the housing 100 through the opening 201' of the outer layer 200'. This arrangement simplifies the assembly of the touch sensing device D2.

Third Embodiment

Figure 10A:
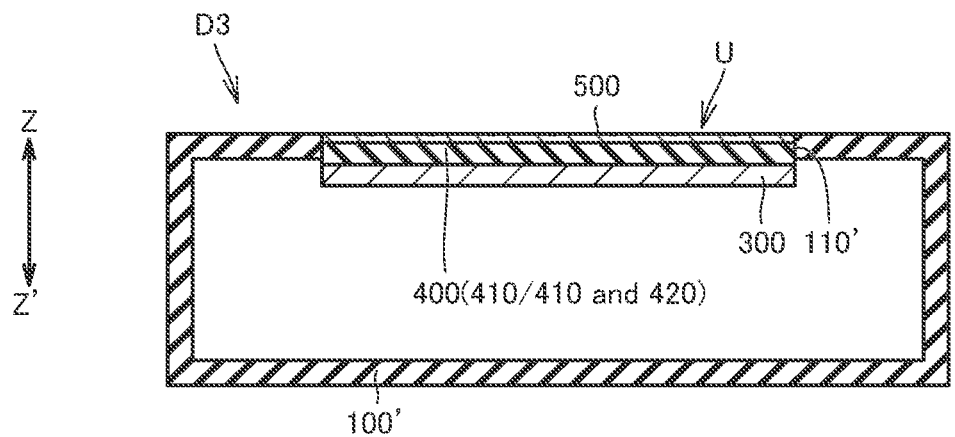
FIG. 10A is a schematic end view, corresponding to FIG. 2A, of a touch sensing device according to a third embodiment of the invention.
Figure 10B:
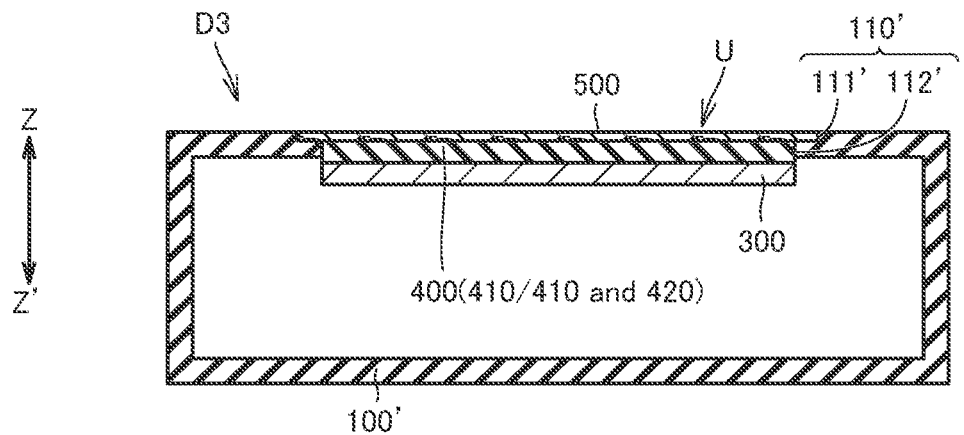
FIG. 10B is a schematic end view, corresponding to FIG. 2A, of a first variant of the connector of the third embodiment.
Figure 10C:
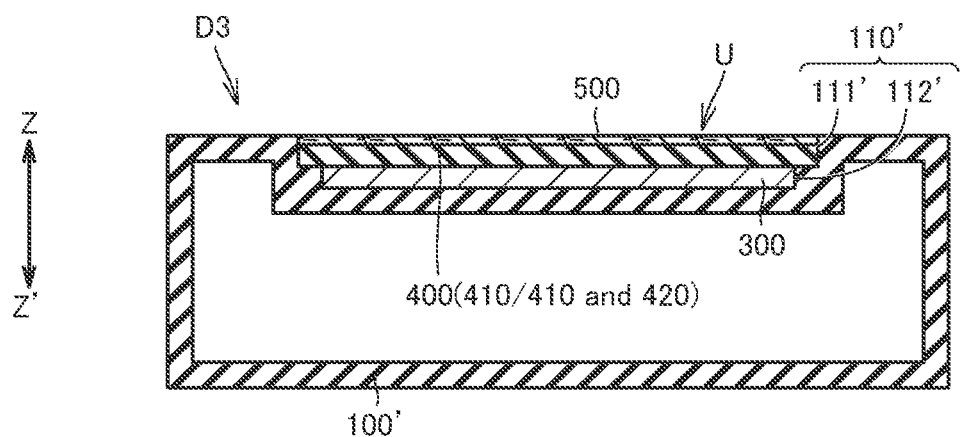
FIG. 10C is a schematic end view, corresponding to FIG. 2A, of a second variant of the connector of the third embodiment.

Hereinafter described is a touch sensing device D3 according to a plurality of embodiments, including a third embodiment and variants thereof, of the invention with reference to FIGS. 10A to 10C. FIG. 10A illustrates the touch sensing device D3 according to the third embodiment. FIG. 10B illustrates a first variant of the touch sensing device D3 according to the third embodiment. FIG. 10C illustrates a second variant of the touch sensing device D3 according to the third embodiment. FIGS. 10A to 10C also indicate the Z-Z' direction, similarly to the touch sensing device D1.

The touch sensing device D3 has the same configuration as the touch sensing device D2 except the following differences: (a) the touch sensing device D3 does not include the outer layer 200' and the intermediate layer 600, and (b) the touch sensing device D3 includes a housing 100' into which the sensor unit U is assembled. The touch sensing device D3 will now be described focusing on these differences from the touch sensing device D2 and omitting overlapping descriptions.

The housing 100' includes an accommodating portion 110'. The accommodating portion 110' may be a through hole passing through the housing 100' in the Z-Z' direction, or may be a blind hole opened in the Z direction and closed on the Z'-direction side. Where the accommodating portion 110' is the through hole, the accommodating portion 110' may have any dimension in the Z-Z' direction. Where the accommodating portion 110' is the blind hole, the dimension in the Z-Z' direction of the accommodating portion 110' may be substantially as large as, larger than, or smaller than, that of the sensor unit U.

Where the cover 500, the or each intermediate layer 400, and the sensor 300 is substantially as large as each other in projected area in the plan view, the accommodating portion 110' has a shape of a projected area in the plan view that is substantially the same as the outer shape of the projected area in the plan view of the cover 500, and the accommodating portion 110' is substantially as large in projected area in the plan view as the cover 500 (see FIG. 10A). In this case, the accommodating portion 110' accommodates the cover 500 of the sensor unit U, the cover 500 and the at least one intermediate layer 400 of the sensor unit U, or the cover 500, the at least one intermediate layer 400, and the sensor 300 of the sensor unit U.

Where the cover 500 is larger in projected area in the plan view than the or each intermediate layer 400 and the sensor 300, and the or each intermediate layer 400 and the sensor 300 are substantially as large as each other in projected area in the plan view (see FIG. 10B), the accommodating portion 110' includes a first hole 111' on the Z-direction side and a second hole 112' on the Z'-direction side. The first hole 111' accommodates the cover 500, a peripheral part of the cover 500 surrounding the at least one intermediate layer 400 is in contact with and covers a peripheral part of the first hole 111' from the Z-direction side, and the second hole 112' accommodates the at least one intermediate layer 400, or the at least one intermediate layer 400 and the sensor 300.

Where the cover 500 and the or each intermediate layer 400 are substantially as large as each other in projected area in the plan view, and the cover 500 and the at least one intermediate layer 400 are each larger than the sensor 300 (see FIG. 10C), the accommodating portion 110' includes a first hole 111' on the Z-direction side and a second hole 112' on the Z'-direction side. The first hole 111' accommodates the cover 500 and the at least one intermediate layer 400, a peripheral part of the at least one intermediate layer 400 surrounding the sensor 300 is in contact with and covers a peripheral part of the first hole 111' from the Z-direction side, and the second hole 112' accommodates the sensor 300. In this case, the second hole 112' may be omitted, and the sensor 300 may be accommodated in the housing 100'.

In a state where the sensor unit U is assembled in the housing 100' in any of the above manners, the sensor unit U may be supported by, or fixed to, the housing 100', or alternatively may be supported by, or fixed to, a support (not illustrated) in the housing 100'. A face on the Z-direction side of a peripheral part of the accommodating portion 110' of the housing 100' may be flush with, or may be different in height position from, a face on the Z-direction side of the cover 500.

The touch sensing device D3 configured as described above provides similar technical features and effects to the technical features and effects (1) to (3) of the touch sensing device D2.

Technical feature and effect (4): The sensor unit U of the touch sensing device D3 can be assembled into the accommodating portion 110' of the housing 100'. This arrangement simplifies the assembly of the touch sensing device D3.

It should be noted that the touch sensing devices described above are not limited to the above embodiments, but can be modified in any manner within the scope of the claims. Some examples of modification will be described below.

The touch sensing device of the invention may include only the sensor unit U of any one of the above aspects.

The cover 500 of the sensor unit U may be exposed through the opening 201' of the outer layer 200' rather than being accommodated in the opening 201'. In this case, the cover 500 may be accommodated in the accommodation hole 601 of the intermediate layer 600 together with the at least one intermediate layer 400, or together with the at least one intermediate layer 400 and the sensor 300. The cover 500 of the sensor unit U may be exposed through the accommodating portion 110' rather than being accommodated in the accommodating portion 110'. In this case, the sensor unit U may be disposed on the Z'-direction side relative to the accommodating portion 110' in the housing 100'. The cover 500 of the sensor unit U may be smaller in projected area in the plan view from the Z-direction side than the or each intermediate layer 400.

The cover 500 of the sensor unit U can be omitted. Where the cover 500 is omitted, when the sensor unit U is used, the sensor unit U without the cover 500 may be assembled into the housing 100 and the intermediate layer 600 or alternatively into the housing 100', and then the outer layer 200 may be disposed so as to cover the sensor unit U, the housing 100, and the intermediate layer 600, or so as to cover the sensor unit U and the housing 100'. Alternatively, a face on the Z-direction side of the at least one intermediate layer 400 of the sensor unit U may include the touch region.

Figure 11A:
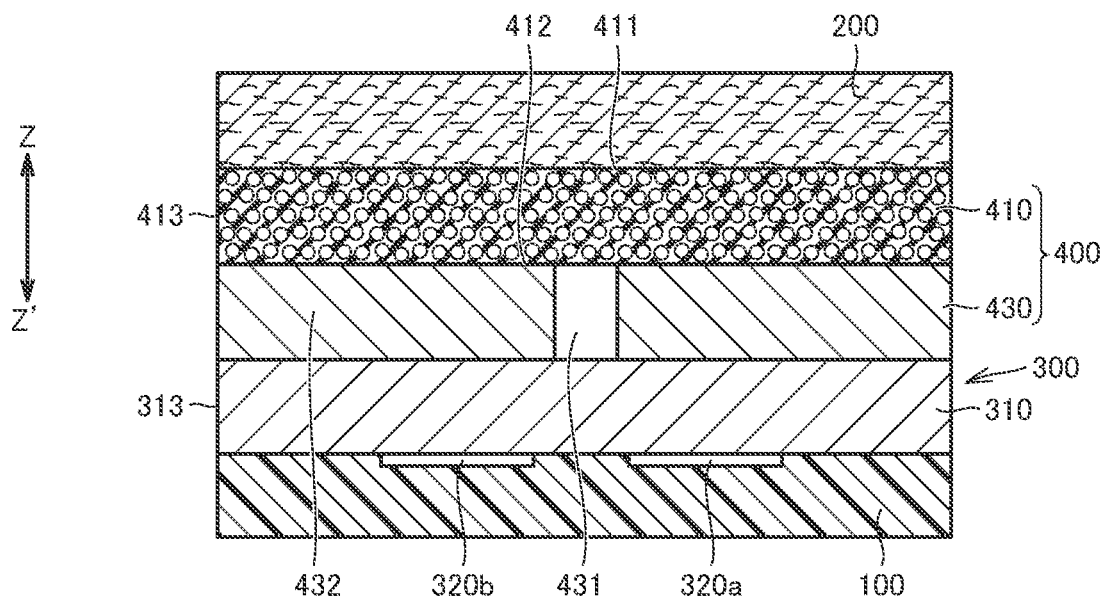
FIG. 11A is a schematic partially enlarged view, corresponding to FIG. 2B, of a twelfth variant of the connector of the first embodiment.
Figure 11B:
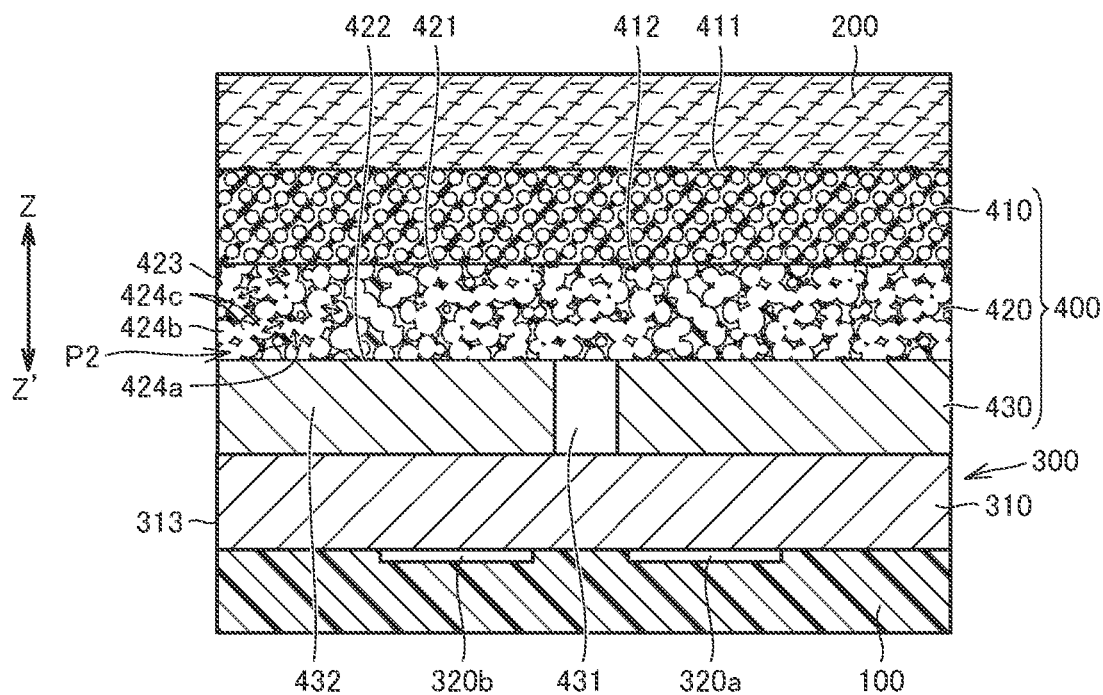
FIG. 11B is a schematic partially enlarged view, corresponding to FIG. 2B, of a thirteenth variant of the connector of the first embodiment.

The at least one intermediate layer 400 of any of the above aspects may further include at least one additional layer in addition to the water shielding layer 410 or alternatively in addition to the water shielding layer 410 and the exhaust layer 420. The water shielding layer 410 and the at least one additional layer, or alternatively the water shielding layer 410, the exhaust layer 420, and the at least one additional layer are laminated in the Z-Z' direction. There may an interlayer member 700 described above between two adjacent layers in the Z-Z' direction of these laminated layers, or alternatively the adjacent layers may be in surface contact without any interlayer members 700 therebetween. An example of the additional layer is a print layer 430 (see FIGS. 11A and 11B). The print layer 430 includes at least one translucent portion 431 and an opaque portion 432 other than the at least one translucent portion 431. The at least one translucent portion 431 is translucent enough to transmit optical signals emitted in the Z direction from a light emitting device disposed on the Z'-direction side relative to the touch sensing device D1, D2, or D3 of any of the above aspects. The opaque portion 432 is configured to block optical signals emitted in the Z direction from the light emitting device and not transmit the optical signals to the Z-direction side relative to the opaque portion 432. Optical signals transmitted through the at least one translucent portion 431 is projected onto the touch region of the outer layer 200 or that of the cover 500. The projected optical signals can be used as an icon or icons. In this case, the touch region of the outer layer 200 or the cover 500 may include a portion on which optical signals are projected, which portion may also be translucent enough to transmit the optical signals. The water shielding layer 410, or alternatively the water shielding layer 410 and the exhaust layer 420, may also be translucent enough to transmit optical signals emitted in the Z direction from the light emitting device. The sensor 300 may also be translucent enough to transmit optical signals emitted in the Z direction from the light emitting device. At least part (e.g., a part located on the Z'-direction side relative to the at least one translucent portion 431) of the housing 100 may also be translucent enough to transmit optical signals emitted in the Z direction from the light emitting device. It should be appreciated that as used herein a "translucent" element may be optically transparent.

The touch sensing devices D1, D2, and D3 according to any of the above aspects may be modified to include a sensor 300' or a sensor 300" described below, in place of the sensor 300. Such modified touch sensing devices D1, D2, and D3 are configured as described above in other respects than the sensor 300' or the sensor 300".

Figure 12A:
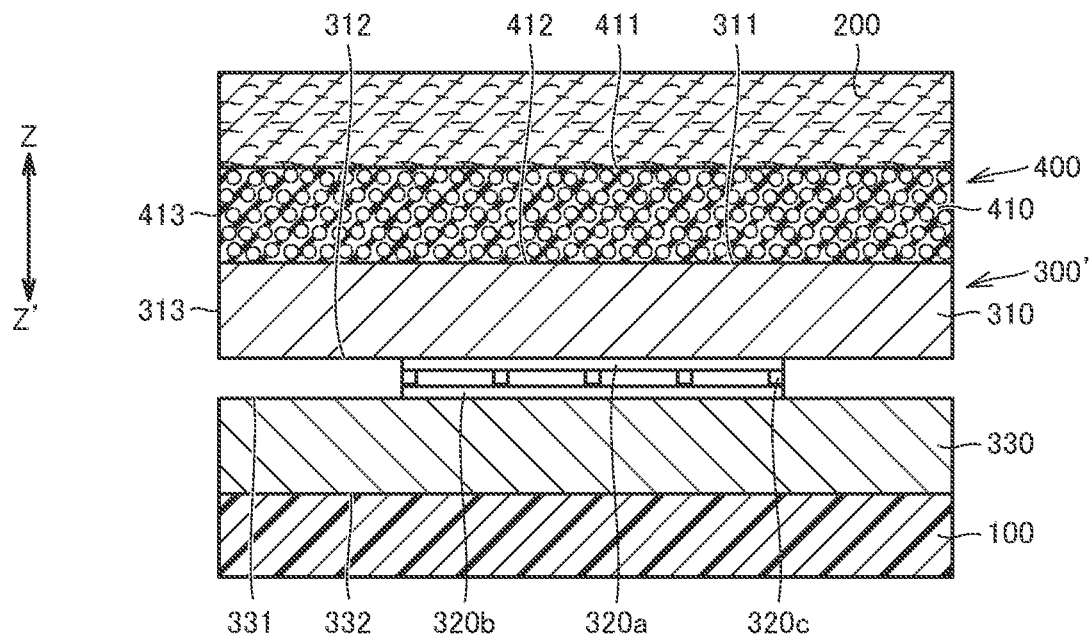
FIG. 12A is a schematic partially enlarged view, corresponding to FIG. 2B, of a fourteenth variant of the connector of the first embodiment.
Figure 12B:
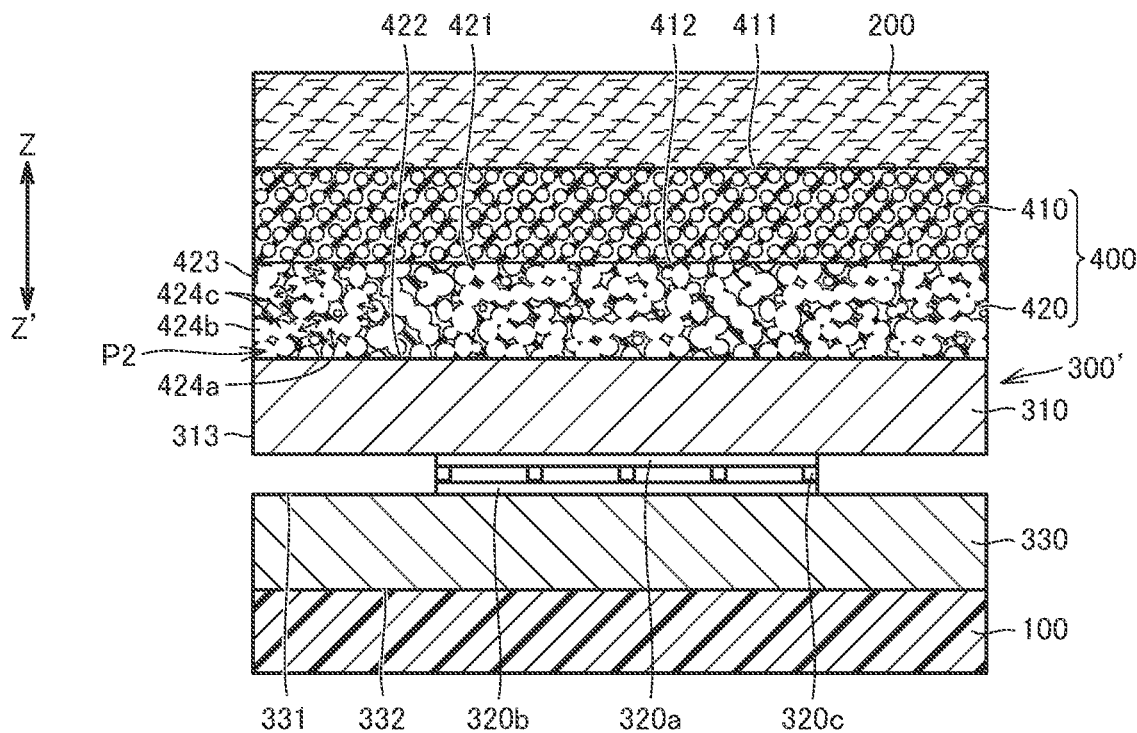
FIG. 12B is a schematic partially enlarged view, corresponding to FIG. 2B, of a fifteenth variant of the connector of the first embodiment.

The sensor 300' is a resistive touch sensor. As illustrated in FIGS. 12A and 12B, the sensor 300' may include at least one sensor layer, at least one first electrode 320a, at least one second electrode 320b, and at least one insulating spacer 320c. The at least one sensor layer may include a first sensor layer 310 and a second sensor layer 330. The first sensor layer 310 includes a first main face 311 on the Z-direction side and a second main face 312 on the Z'-direction side. The second sensor layer 330 includes a first main face 331 on the Z-direction side and a second main face 332 on the Z'-direction side. The at least one first electrode 320a is provided on the second main face 312 of the first sensor layer 310. The at least one second electrode 320b is provided on the first main face 331 of the second sensor layer 330, in spaced relation to the at least one first electrode 320a in the Z-Z' direction. The at least one spacer 320c is interposed between, and separates between, the at least one first electrode 320a and the at least one second electrode 320b. When a detection target approaches from the Z-direction side and then applies load onto part of the at least one first electrode 320a, at least the part of the at least one first electrode 310a flexes, comes into contact with, comes into electrical conduction with, the at least one second electrode 320b. The controller is configured to detect the electrical conduction and thereby determine that the detection target has touched a portion on the Z-direction side relative to the first electrode 320a.

Figure 13A:
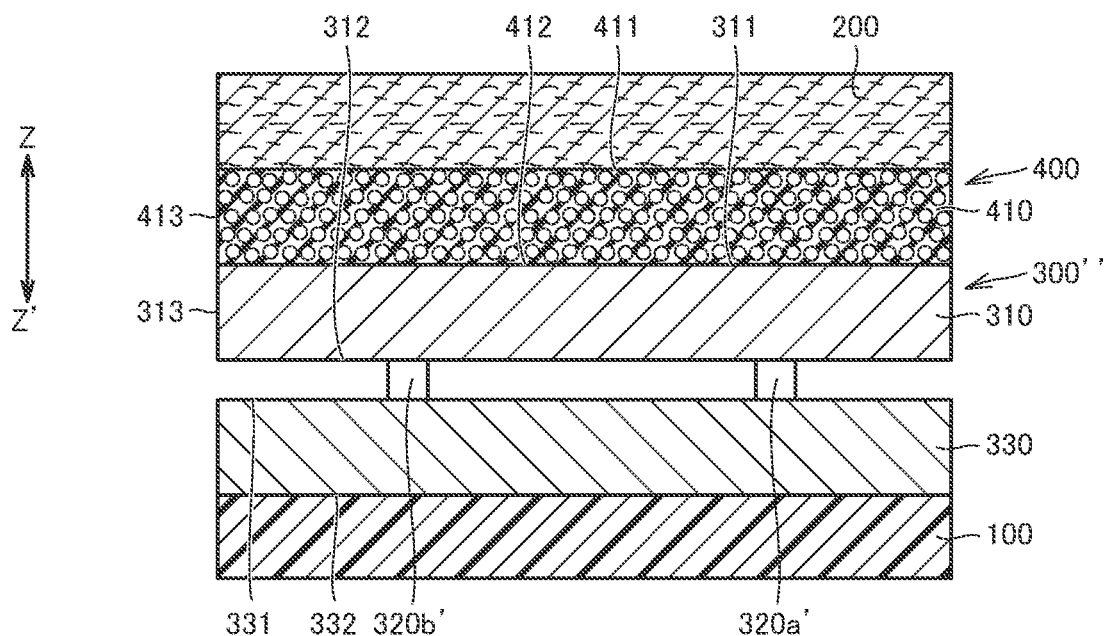
FIG. 13A is a schematic partially enlarged view, corresponding to FIG. 2B, of a sixteenth variant of the connector of the first embodiment.
Figure 13B:
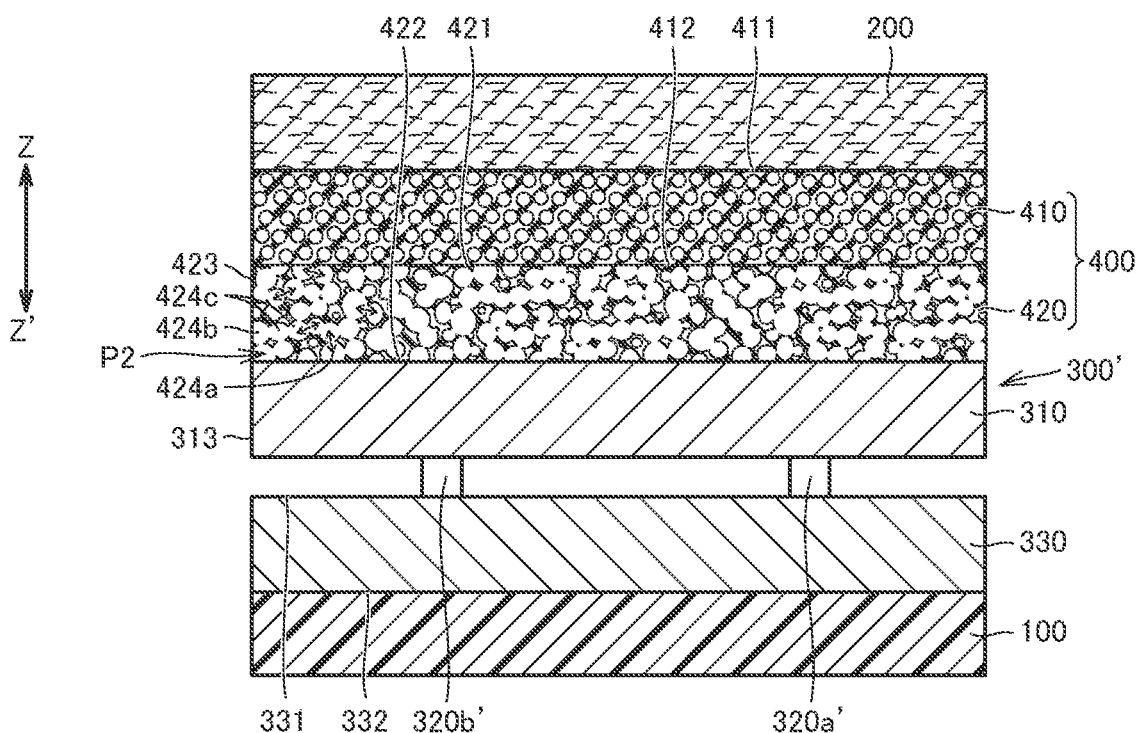
FIG. 13B is a schematic partially enlarged view, corresponding to FIG. 2B, of a seventeenth variant of the connector of the first embodiment.

The sensor 300" is an optical touch sensor. As illustrated in FIGS. 13A and 13B, the sensor 300" may include at least one sensor layer, at least one light emitting device 320a', and at least one light receiving device 320b'. In this case, the at least one sensor layer may include a first sensor layer 310 and a second sensor layer 330. The first sensor layer 310 includes a first main face 311 on the Z-direction side and a second main face 312 on the Z'-direction side. The second sensor layer 330 includes a first main face 331 on the Z-direction side and a second main face 332 on the Z'-direction side. The at least one light emitting device 320a' and the at least one light receiving device 320b' are provided between the second main face 312 of the first sensor layer 310 and the first main face 331 of the second sensor layer 330 to face each other. The at least one light receiving device 320b' is configured to receive optical signals emitted from the at least one light emitting device 320a' and output signals. A detection target approaching from the Z-direction side blocks optical signals emitted from the at least one light emitting device 320a', in which case no signals are outputted from the at least one light receiving device 320b'. The controller is configured to detect the absence of signal inputs from the at least one light receiving device 320b' and thereby determine that the detection target has touched a portion on the Z-direction side relative to the area between the at least one light receiving device 320b' and the at least one light emitting device 320a'.

The sensor 300 of any of the above aspects may include a plurality of the first electrodes 320a, or a plurality of the first electrodes 320a and a plurality of the second electrodes 320b. The sensor 300' of any of the above aspects may include a plurality of the first electrodes 320a and a plurality of the second electrodes 320b. The sensor 300" of any of the above aspects may include a plurality of the light emitting devices 320a' and a plurality of the light receiving devices 320b". In any of these cases, the sensor of any of the above aspects may be a touch sensing panel (touch sensor) configured to detect coordinates of a touch region.

REFERENCE SIGNS LIST

D1, D2, D3: touch sensing device
100, 100': housing
200, 200': outer layer
300: sensor
   310: first sensor layer
      311: first main face; 312: second main face; 313: side face
   320a: first electrode; 320b: second electrode
   330: second sensor layer
      331: first main face; 332: second main face
400: intermediate layer (first intermediate layer)
   410: water shielding layer
      411: first main face; 412: second main face; 413: side face
   420: exhaust layer
      421: first main face; 422: second main face; 423: side face; 424a: first bubble; 424b: second bubble; 424c: third bubble
500: cover
600: intermediate layer (second intermediate layer)
P1: exhaust path
P2: exhaust path
U: sensor unit

What is claimed is:

1. A touch sensing device comprising:
a sensor being a capacitive, resistive, or optical touch sensor, the sensor being configured to detect a detection target approaching the sensor from one side in a first direction and including at least one first electrode and at least one second electrode, the at least one first electrode being configured such that signals of the or each first electrode change in accordance with a change in capacitance between the or each first electrode and the or each second electrode, the change being caused by an approach of the detection target from the one side in the first direction, the first direction being a thickness direction of the sensor; and
a water shielding layer being composed of a waterproof elastic substance, wherein
the water shielding layer is substantially as large as, or larger than, the sensor in projected area in a plan view of the one side in the first direction, larger than the at least one first electrode in projected area in the plan view of the one side in the first direction, and larger than the at least one second electrode in projected area in the plan view of the one side in the first direction, and
the water shielding layer is disposed on the one side in the first direction relative to the sensor, covers substantially the entire sensor from the one side in the first direction, and entirely covers the at least one second electrode and the at least one second electrode from the one side in the first direction.

2. The touch sensing device according to claim 1, wherein
the sensor includes a first main face on the one side in the first direction, and
the water shielding layer includes a first main face on the one side in the first direction, a second main face on the other side in the first direction, and a side face intersecting the second main face,
the second main face of the water shielding layer is in surface contact with the first main face of the sensor or alternatively in contact with the first main face of the sensor via an interlayer member disposed therebetween,
the touch sensing device further comprises at least one exhaust path,
the at least one exhaust path is provided on at least one face of the second main face of the water shielding layer or the first main face of the sensor, opens out to the at least one face, and opens out to a side face intersecting the at least one face, or alternatively the at least one exhaust path is provided in the interlayer member, opens out to the at least one face of the second main face of the water shielding layer and the first main face of the sensor, and opens out to a side face of the interlayer member.

3. The touch sensing device according to claim 1, further comprising an exhaust layer, wherein
the sensor includes a first main face on the one side in the first direction,
the exhaust layer is disposed between the water shielding layer and the sensor and includes a first main face on the one side in the first direction, a second main face on the other side in the first direction, and a side face intersecting the second main face, and
the second main face of the exhaust layer is in surface contact with the first main face of the sensor or alternatively in contact via an interlayer member disposed therebetween,
the touch sensing device further comprises at least one exhaust path,
the at least one exhaust path is provided on at least one face of the second main face of the exhaust layer or the first main face of the sensor, opens out to the at least one face, and opens out to a side face intersecting the at least one face, or alternatively the at least one exhaust path is provided in the interlayer member, opens out to the at least one face of the second main face of the exhaust layer and the first main face of the sensor, and opens out to a side face of the interlayer member.

4. The touch sensing device according to claim 3, wherein
the exhaust layer is composed of an open-cell foam substance inside of which a plurality of interconnected bubbles is provided,
the plurality of bubbles in the exhaust layer includes a first bubble opening out to the second main face of the exhaust layer, a second bubble opening out to the side face of the exhaust layer, and at least one third bubble connecting the first bubble and the second bubble, and
the first bubble, the second bubble, and the at least one third bubble constitute the at least one exhaust path.

5. The touch sensing device according to claim 1, wherein
the sensor further includes at least one sensor layer including a first sensor layer, the first sensor layer including a first main face on the one side in the first direction and a second main face on the other side in the first direction,
the at least one first electrode is provided on at least one face of the first or second main face of the first sensor layer, and
the at least one second electrode is provided on at least one face of the first or second main face of the first sensor layer.

6. The touch sensing device according to claim 1, wherein
the sensor further includes at least one sensor layer including:
a first sensor layer including a first main face on the one side in the first direction and a second main face on the other side in the first direction, and
a second sensor layer on the other side in the first direction relative to the first sensor layer, the second sensor layer including a first main face on the one side in the first direction and a second main face on the other side in the first direction,
the at least one first electrode is provided on at least one face of the first or second main face of the first sensor layer, and
the at least one second electrode is provided on at least one face of the first or second main face of the second sensor layer.

7. The touch sensing device according to claim 5, wherein
the at least one first electrode is configured such that signals of the or each first electrode change in accordance with a first change in capacitance between the or each first electrode and a detection target, and such that signals of the or each first electrode change in accordance with a second change in capacitance between the or each first electrode and the or each second electrode, the first and second changes being caused by an approach of the detection target from the one side in the first direction.

8. The touch sensing device according to claim 6, wherein
the at least one first electrode is configured such that signals of the or each first electrode change in accordance with a first change in capacitance between the or each first electrode and a detection target, and such that signals of the or each first electrode change in accordance with a second change in capacitance between the or each first electrode and the or each second electrode, the first and second changes being caused by an approach of the detection target from the one side in the first direction.

9. The touch sensing device according to claim 1, further comprising:
an outer layer including a touch region to be contacted by a detection target from the one side in the first direction; and
at least one first intermediate layer between the outer layer and the sensor, wherein
the at least one first intermediate layer includes the water shielding layer, and
the water shielding layer is disposed on the other side in the first direction relative to at least part of the outer layer.

10. The touch sensing device according to claim 9, wherein
the outer layer is provided with a through hole, and
the water shielding layer blocks the through hole of the outer layer from the other side in the first direction.

11. The touch sensing device according to claim 9, wherein
the outer layer includes a plurality of parts, and adjacent two of the parts are joined together, and the water shielding layer is in surface contact with a joint of the two adjacent parts of the outer layer from the other side in the first direction.

12. The touch sensing device according to claim 9, further comprising a housing supporting the sensor, wherein
the water shielding layer is larger than the sensor in projected area in the plan view of the one side in the first direction, and
the water shielding layer is disposed between the outer layer and a combination of the sensor and the housing.

13. The touch sensing device according to claim 1, further comprising:
a cover including a touch region to be contacted by a detection target from the one side in the first direction; and
at least one first intermediate layer between the cover and the sensor, wherein
the at least one first intermediate layer includes the water shielding layer.

14. The touch sensing device according to claim 13, further comprising an outer layer having an opening, wherein the cover is exposed through, or accommodated in, the opening of the outer layer.

15. The touch sensing device according to claim 14, further comprising:
a housing supporting the sensor; and
a second intermediate layer between the outer layer and the housing,
wherein the second intermediate layer includes an accommodation hole accommodating the at least one first intermediate layer.

16. The touch sensing device according to claim 9, wherein
the at least one first intermediate layer further includes a print layer,
the print layer includes at least one translucent portion and an opaque portion other than the at least one translucent portion, and
the water shielding layer is translucent.

17. The touch sensing device according to claim 13, further comprising a housing having an accommodating portion,
wherein the cover is exposed through, or accommodated in, the accommodating portion.

18. The touch sensing device according to claim 1, wherein the exhaust layer is composed of a closed-cell foam substance having waterproofness, the exhaust layer having a plurality of bubbles that are independent from each other and do not communicate with each other.

19. The touch sensing device according to claim 2, wherein the at least one exhaust path is at least one through hole or groove in at least one face of the second main face of the water shielding layer or the first main face of the sensor, or alternatively the at least one exhaust path is at least one through hole or groove in the interlayer member.

* * * * *